United States Patent
Beers et al.

(10) Patent No.: US 7,434,006 B2
(45) Date of Patent: Oct. 7, 2008

(54) NON-SPECULATIVE DISTRIBUTED CONFLICT RESOLUTION FOR A CACHE COHERENCY PROTOCOL

(75) Inventors: Robert H. Beers, Hillsboro, OR (US);
Herbert H. J. Hum, Portland, OR (US);
James R. Goodman, Madison, WI (US)

(73) Assignee: Intel Corporation, Santa Clara, CA (US)

( * ) Notice: Subject to any disclaimer, the term of this patent is extended or adjusted under 35 U.S.C. 154(b) by 594 days.

(21) Appl. No.: 11/165,688

(22) Filed: Jun. 24, 2005

(65) Prior Publication Data
US 2005/0237941 A1    Oct. 27, 2005

Related U.S. Application Data

(62) Division of application No. 10/326,232, filed on Dec. 19, 2002, now Pat. No. 6,954,829.

(51) Int. Cl.
*G06F 12/08*    (2006.01)
(52) U.S. Cl. .................. 711/141; 711/130; 711/148; 711/150; 709/216; 709/232; 709/235; 709/238
(58) Field of Classification Search .............. 711/130, 711/141, 148, 150; 709/216, 230, 232, 235, 709/238; 710/240; 712/28
See application file for complete search history.

(56) References Cited

U.S. PATENT DOCUMENTS

| | | | |
|---|---|---|---|
| 6,009,488 A | 12/1999 | Kavipurapu | |
| 6,275,905 B1 | 8/2001 | Keller et al. | |
| 6,279,085 B1 * | 8/2001 | Carpenter et al. | 711/143 |
| 6,405,289 B1 | 6/2002 | Arimilli et al. | |
| 6,442,597 B1 * | 8/2002 | Deshpande et al. | 709/214 |
| 6,457,100 B1 * | 9/2002 | Ignatowski et al. | 711/119 |
| 6,594,733 B1 * | 7/2003 | Cardente | 711/145 |
| 2002/0044550 A1 * | 4/2002 | Keller | 370/386 |

(Continued)

OTHER PUBLICATIONS

Azimi, M. et al., "Scalability port: a coherent interface for shared memory multiprocessors", *Proceedings of the 10th Symposium on High Performance Interconnects Hot Interconnects (Hot'l 02)*, (Aug. 21, 2002), pp. 65-70.

(Continued)

*Primary Examiner*—Jack A Lane
(74) *Attorney, Agent, or Firm*—Caven & Aghevli LLC

(57) ABSTRACT

A conflict resolution technique provides consistency such that all conflicts can be detected by at least one of the conflicting requestors if each node monitors all requests after that node has made its own request. If a line is in the Exclusive, Modified or Forward state, conflicts are resolved at the node holding the unique copy. The winner of the conflict resolution, and possibly the losers, report the conflict to the home node, which pairs conflict reports and issues forwarding instructions to assure that all requesting nodes eventually receive the requested data. If a requested cache line is either uncached or present only in the Shared state, the home node provides a copy of the cache node and resolves conflicts. In one embodiment, a blackout period after all responses until an acknowledgement message has been received allows all conflicting nodes to be aware of conflicts in which they are involved.

18 Claims, 24 Drawing Sheets

U.S. PATENT DOCUMENTS

2002/0129211 A1  9/2002  Arimilli et al.
2002/0178210 A1* 11/2002  Khare et al. ................ 709/107

OTHER PUBLICATIONS

"European Search Report (EP03257787) dated Feb. 23, 2007".

Jim Handy, "The Cache Memory Book," Second Edition, 1998, pp. vii-229, Academic Press Limited, London, United Kingdom.

"IEEE Standard for Scalable Coherent Interface (SCI)," IEEE Std 1596-1992, 1992, pp. i-243, Institute of Electrical and Electronics Engineers, Inc., USA.

"UltraSPARC User's Manual, UltraSPARC-I, UltraSPARC-II," Jul. 1997, pp. iii-394, Sun Microsystems, USA.

* cited by examiner

NON-SPECULATIVE DISTRIBUTED CONFLICT RESOLUTION FOR A CACHE COHERENCY PROTOCOL

RELATED APPLICATIONS

This U.S. Patent application is a divisional of U.S. patent application Ser. No. 10/326,232 filed Dec. 19, 2002 now U.S. Pat. No. 6,954,829.

RELATED APPLICATIONS

The present U.S. Patent application is related to the following U.S. Patent applications filed concurrently:

(1) application Ser. No. 10/525,069, filed Dec. 19, 2002, entitled "FORWARD STATE FOR USE IN CACHE COHERENCY IN A MULTI-NODE SYSTEM"

(2) application Ser. No. 10,326,234, filed Dec. 19, 2002, entitled "HIERARCHICAL DIRECTORIES FOR CACHE COHERENCY IN A MULTIPROCESSOR SYSTEM"

(3) application Ser. No. 10/324,711, filed Dec. 19, 2002, entitled "HIERARCHICAL VIRTUAL MODEL OF A CACHE HIERARCHY IN A MULTIPROCESSOR SYSTEM"

(4) application Ser. No. 10/325,427,filed Dec. 19 ,2002, entitled "SPECULATIVE DISTRIBUTED CONFLICT RESOLUTION FOR A CACHE COHERENCY PROTOCOL"

FIELD

The invention relates to cache memories. More particularly, the invention relates to distributed conflict resolution in a multi-cache multiprocessor system.

BACKGROUND

When an electronic system includes multiple cache memories, the validity of the data available for use must be maintained. This is typically accomplished by manipulating data according to a cache coherency protocol. As the number of caches and/or processors increases, the complexity of maintaining cache coherency also increases.

When multiple components (e.g., a cache memory, a processor) request the same block of data the conflict between the multiple components must be resolved in a manner that maintains the validity of the data. Current cache coherency protocols typically have a single component that is responsible for conflict resolution. However, as the complexity of the system increases reliance on a single component for conflict resolution can decrease overall system performance.

FIGS. 1a through 1e provide a conceptual illustration of a conflict condition in a multi-node system. Nodes 110, 120 and 130 are peer nodes that can store a copy of the requested data (e.g., a cache line) in cache memory. Home node 140 is the Home (H) node for the requested data. In the example of FIGS. 1a through 1e, peer nodes 110 and 120 store an invalid copy, or no copy, of the requested data and peer node 130 stores a modified copy of the requested data that has not been written back to memory. The Home node stores the original copy of the data in memory or modified versions of the data when the modifications are written back to memory.

As illustrated in FIG. 1a, peer node 120 transmits a Data Request message to request a copy of a block of data, for example, a cache line. The Data Request message is transmitted to peer node 110 and to peer node 130. However, the Data Request message to peer node 130 is delayed. The delay can be caused, for example, by lack of available bandwidth, buffering considerations, etc.

Peer node 110 responds to the Data Request message from peer node 120 with a No Valid Copy message, which indicates to peer node 120 that peer node 110 does not have a valid copy of the requested data. At some time after peer node 120 transmits Data Request messages, Peer node 110 transmits Data Request messages to peer nodes 120 and 130, as illustrated in FIG. 1c, requesting the same data as was requested by peer node 120.

Peer node 120 provides a No Valid Copy message to peer node 110 in response to the Data Request message. Peer node 130 provides the requested data to peer node 110. The copy of the data, if any, maintained by peer node 130 is marked invalid and the copy of the data stored by peer node 110 is marked Modified.

At some time after peer node 130 has responded to the Data Request from peer node 110 and invalidated the copy of the data, peer node 130 receives the delayed Data Request message from peer node 120, as illustrated in FIG. 1c. In response to the Data Request message, peer node 130 provides a No Valid Copy message to peer node 120. Note that the state of the data stored by peer node 130 changed from the time of the original Data Request message to the time the peer node 130 responds to the Data Request message.

Because peer nodes 110 and 130 respond to the Data Request message from peer node 120 with No Valid Copy messages, peer node 120, finding no valid cached copy of the requested data, requests a copy of the data from home node 140. Thus, as illustrated in FIG. 1d, peer node transmits a Read message to home node 140. Home node 140 retrieves the requested data from memory and provides the data to peer node 120. Peer node 120 then stores the requested data in the Exclusive state.

As illustrated in FIG. 1e, the sequence of messages illustrated in FIGS. 1a through 1e result in two incompatible copies of a data line. In the example provided peer node 110 stores a copy of the data in the Modified state and peer node 120 stores a copy of the data in the Exclusive state. However, the copy stored by peer node 120 is not exclusive to peer node 120. Thus, multi-node systems can result in incompatible copies of data under certain circumstances unless a mechanism is provided to resolve cache conflicts.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Figure 1A:
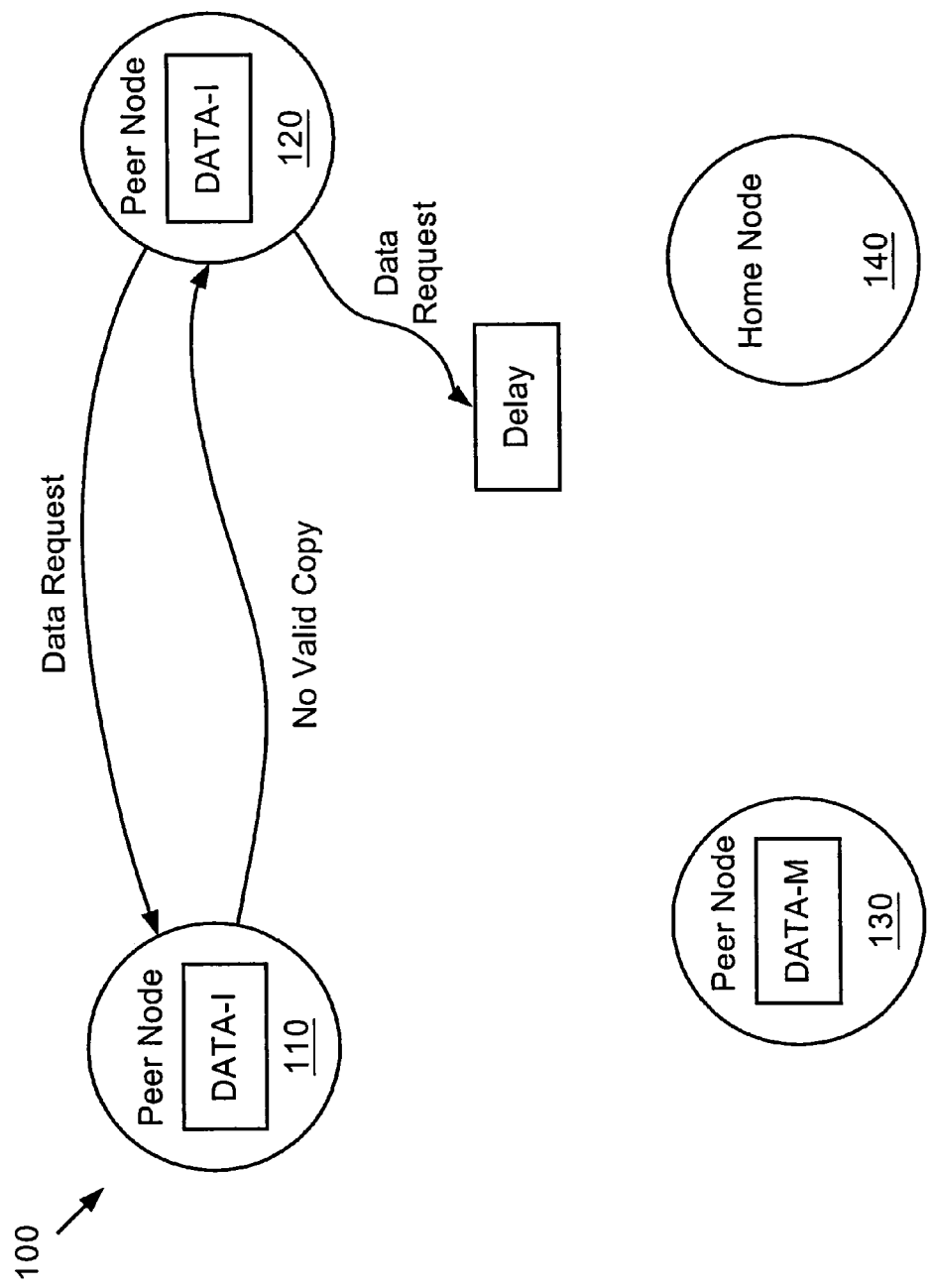
FIGS. 1a through 1e provide a conceptual illustration of a conflict condition in a multi-node system.
Figure 1B:
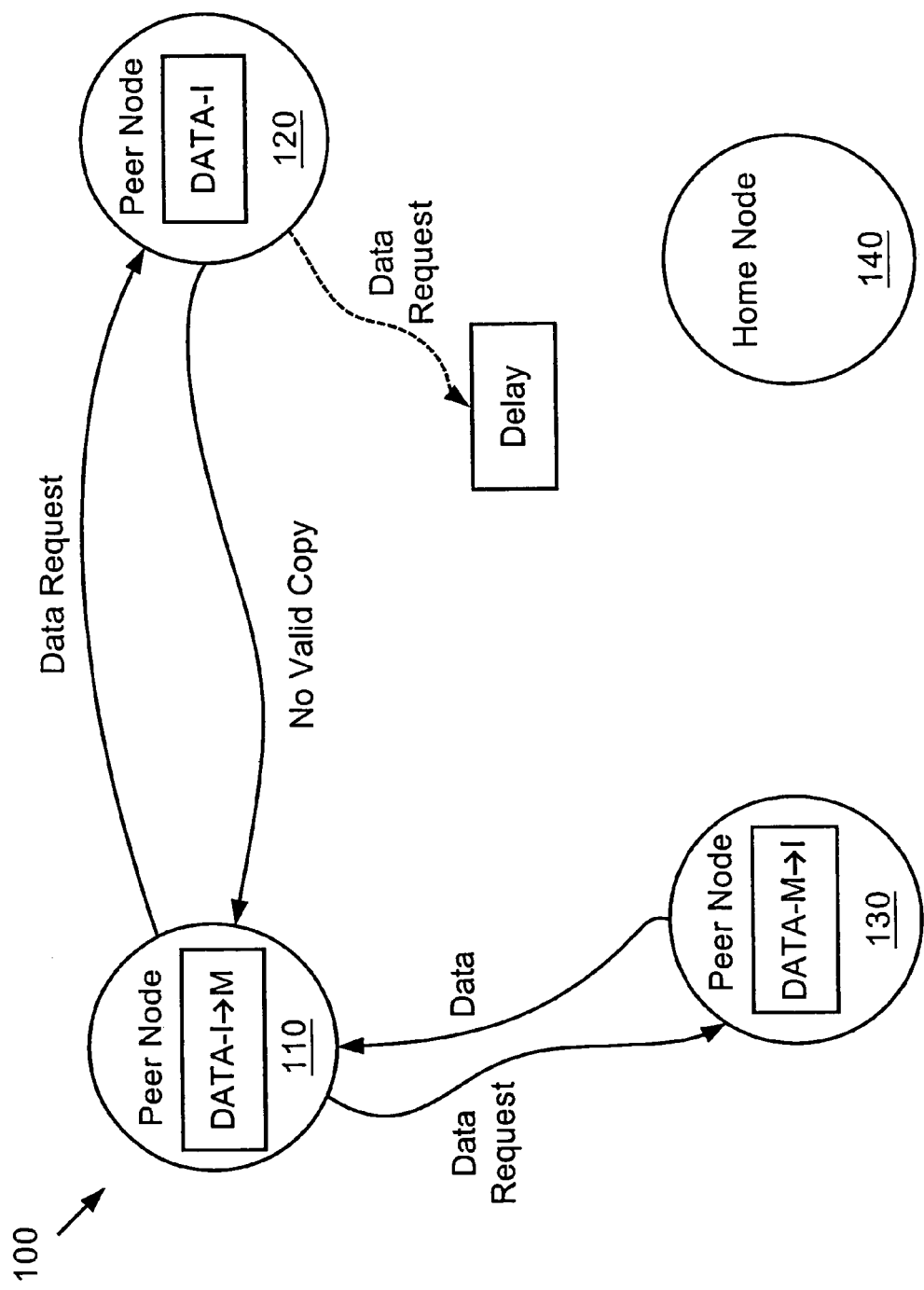
Figure 1C:
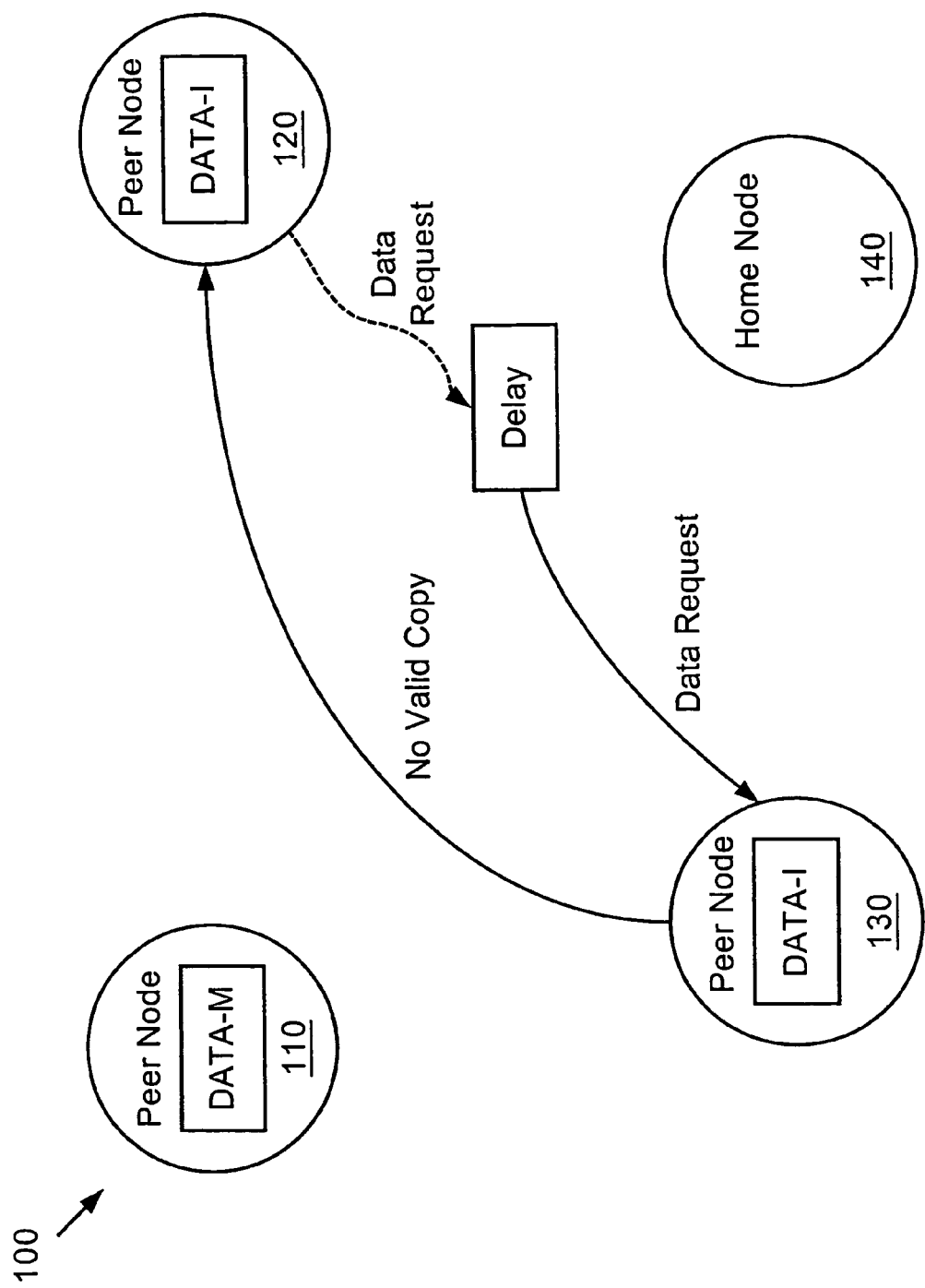
Figure 1D:
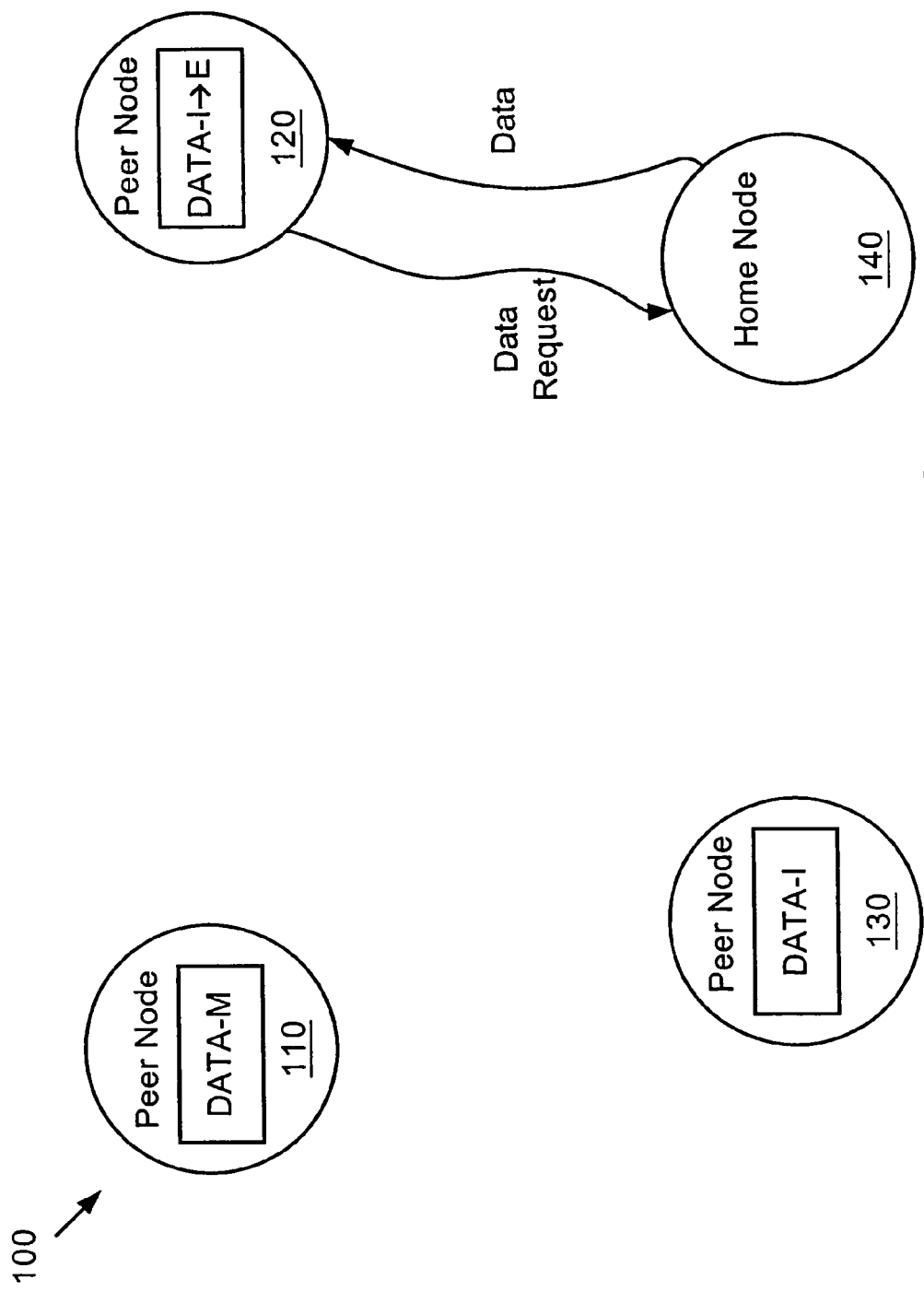
Figure 1E:
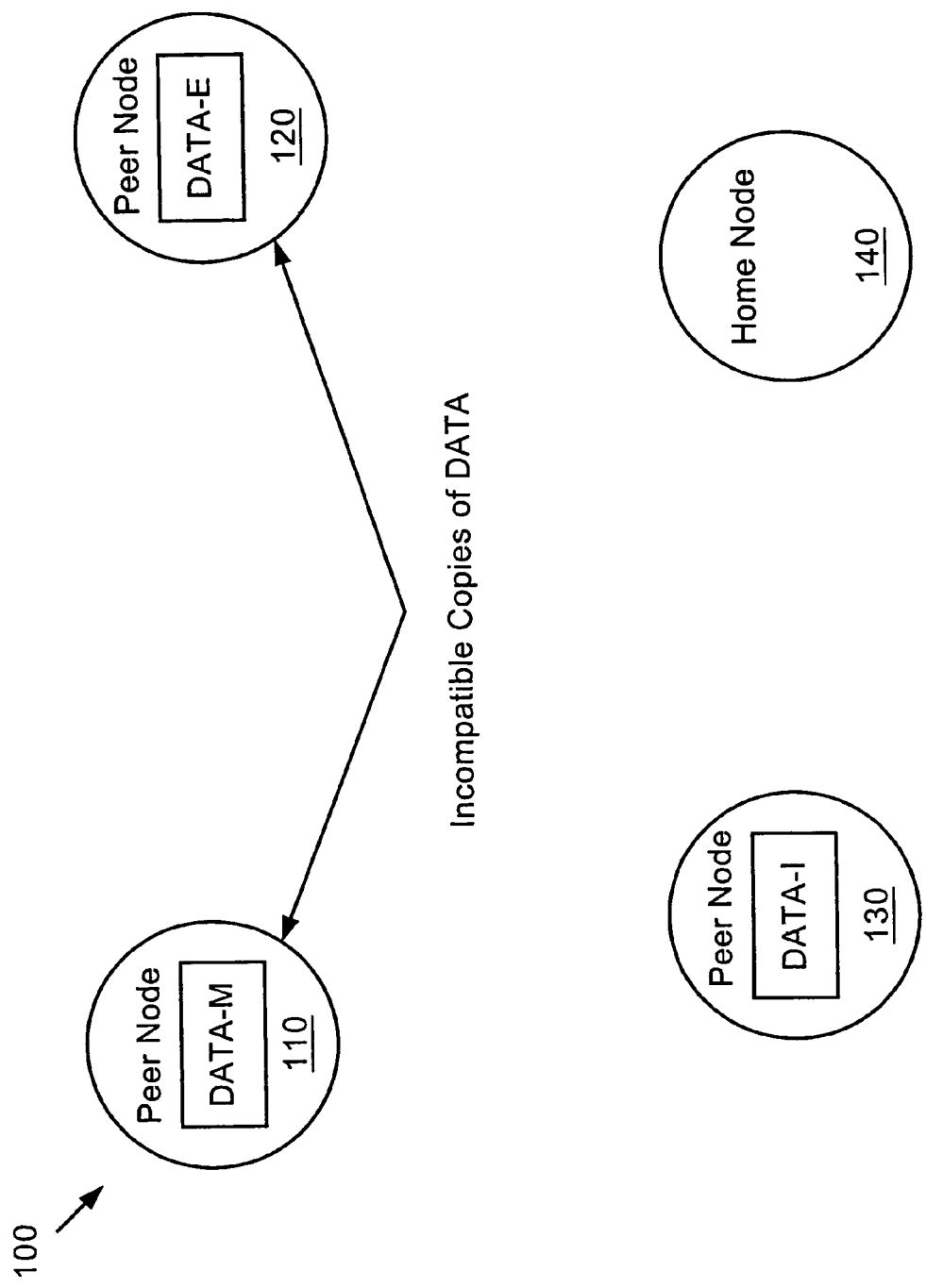

Techniques for piggybacking multiple cache protocol messages into a single message packet are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Request Messages

The following messages are requests for data/action from a requesting node. These messages are broadcast to all nodes of the system.

Port Read Line (PRL): This is a request for a copy of a data segment such as, for example, a cache line.

Port Read Invalidate Line (PRIL): This is a request for a copy of a data segment where the provider node's copy of the data is invalidated. This message can also be referred to as a "request for ownership."

Port Write Line (PWL): This message causes data (e.g., a modified cache line) to be written to memory. This message can also referred to as a "dirty eviction."

Port Invalidate Line (PIL): This message causes the state of designated data to change from Shared to Exclusive.

Port Write Invalidate Line (PWIL): This message causes data to be written to memory and the target copy of the data to be invalidated.

Response Messages

The following messages are messages from sent from Peer (i.e., Non-Home) nodes to the Requesting node in response to requests described above.

Invalid State Acknowledgement (IACK): This message is a response to a request (PRL, PRIL, PIL, PWIL) when the node sending the response has an invalid copy of the requested data or no copy of the requested data.

Shared State Acknowledgement (SACK): This message is a response to a PRL request when the node sending the response has a copy of the requested data in the Shared state.

Acknowledgement of Data Received (DACK): This message acknowledges the receipt of requested data. This node is sent by the home node when the home node receives a CNCL message. The target node for the DACK message is the forwarding node included in the CNCL message. A node receiving the transferred data or memory data from the home node does not respond to the sending node.

Conflict: This message indicates that there is a copending request for the requested cache line.

Data (Conflicts): This message is used to forward data and lists conflicts, if any. The conflict list is empty when data is forwarded or when the home node sends memory data to the first owner. When data is transferred, the sending node attaches a list of conflicts. The receiving node uses the list to send CNFL responses to matching requests stored in a buffer.

Messages to Home Node

These messages are transmitted to the Home node by a Peer node.

Read (Conflicts): This message requests data from the Home node and lists conflicts, if any. This message is sent after all responses are received by a peer node if none of the received messages were a DATA message.

CNCL (Conflicts): This message is sent to the Home node in response to a hit in a Peer node and lists all conflicts, if any. This message cancels the Home node's prefetch operation.

Messages from the Home Node

These messages are sent from the Home node to the Peer and/or Requesting nodes.

Data: This message includes the requested data and can indicate the state of the data (M/E/F) to be used by the Requesting node.

Acknowledge (ACK): This message indicates that the requested data has been sent to the Requesting node. When the home node sends an ACK message, the current epoch is terminated.

Transfer (XFR): This message causes the receiving node to transfer data to the node indicated in the message. The home node sends this message to the current owner of requested data when the home node is informed of a conflict condition requiring that the current owner of the data transfer the data to the target node. A XFRI message is sent instead of a XFR message if the home node determines that an unresolved conflicting request is a PRIL or PWIL message, meaning that the current owner must invalidate the line when initiating the data transfer. In one embodiment, the first node in an epoch to send a CNCL message is the current owner. An epoch is the period between a first request for data and the resolution of all conflicting requests for the data. If the home node sends data to a node from memory, that node is the current owner. Sending a XFR/XFRI message causes the target node to become the current owner. In one embodiment, the target node is selected from a list of conflicts provided to the home node in a READ or a CNCL message. Target nodes are selected from nodes from which the home node has received a READ message. Thus, if the home node has A as the current owner of a cache line because A sent the home node a CNCL(B,C), the home node waits until a READ message comes from B or C to send a XFR/XFRI message to A to cause A to forward the data to the node (B or C) that sent the READ message. The home node then waits for the third node to sent a READ message before sending a XFR/XFRI message causing the data to be sent to the third node.

Overview of the MESIF Protocol

There are two basic schemes for providing cache coherence, snooping (now often called Symmetric MultiProcessing SMP) and directories (often called Distributed Shared Memory DSM). The fundamental difference has to do with placement and access to the meta-information, that is, the information about where copies of a cache line are stored.

For snooping caches the information is distributed with the cached copies themselves, that is, each valid copy of a cache line is held by a unit that must recognize its responsibility whenever any node requests permission to access the cache line in a new way. Someplace—usually at a fixed location—is a repository where the data is stored when it is uncached. This location may contain a valid copy even when the line is cached. However, the location of this node is generally unknown to requesting nodes—the requesting nodes simply broadcast the address of a requested cache line, along with permissions needed, and all nodes that might have a copy must respond to assure that consistency is maintained, with the node containing the uncached copy responding if no other (peer) node responds.

For directory-based schemes, in addition to a fixed place where the uncached data is stored, there is a fixed location, the directory, indicating where cached copies reside. In order to access a cache line in a new way, a node must communicate with the node containing the directory, which is usually the same node containing the uncached data repository, thus allowing the responding node to provide the data when the main storage copy is valid. Such a node is referred to as the Home node.

The directory may be distributed in two ways. First, main storage data (the uncached repository) is often distributed among nodes, with the directory distributed in the same way. Secondly, the meta-information itself may be distributed, keeping at the Home node as little information as whether the line is cached, and if so, where a single copy resides.

Snooping schemes rely on broadcast, because there is no single place where the meta-information is held, so all nodes must be notified of each query, each node being responsible for doing its part to assure that coherence is maintained. This includes intervention messages, informing the Home node not to respond when another node is providing the data.

Snooping schemes have the advantage that responses can be direct and quick, but do not scale well because all nodes are required to observe all queries. Directory schemes are more scalable, but require more complex responses, often involving three nodes in point-to-point communications.

The basic MESIF protocol described herein provides a snooping-like protocol without the limitations of a single, serializing bus. Like a snooping cache protocol, MESIF relies on nodes with cached copies of data to maintain coherence. The use of point-to-point links rather than a synchronous, centralized broadcast introduces the problem of time-warp—the fact that events appear to occur in a different order from the viewpoint of different node. As described in greater detail below, the MESIF protocol handles time-warp, recognizing when potential errors could result and making sure that they are handled correctly. The notion of a Home node is used to determine where the uncached copy reside, but the Home node participates in every transaction—without being on the critical path—in order to resolve conflicts and time-warp issues. Because of the concurrent-broadcast nature of the scheme, MESIF achieves the low latency associated with snooping protocols, acquiring a cacheable copy of the data in most cases in the minimum possible latency: a single roundtrip request-response.

The basic MESIF protocol involves broadcasting an initial request to all peer nodes as well as the Home node. If a copy is cached in state E, F, or M, it is included in the response. A second message is then sent to the Home node, informing it that the request has been satisfied. If the requested line is uncached, or if only S-state copies exist, the second request sent to the Home node is used to confirm the previous request, which the Home node may have by now fetched from its memory. In either case, the Home node must respond to the second request (and to the first, though they can sometimes be combined) for purposes of synchronization and conflict resolution. Note that the Home node may have one or more caches, so it may respond to the initial request just like any other node.

Conflicts are handled in a distributed way. The timewarp problem makes it difficult to detect conflicts, because individual requests can be delayed for an arbitrarily long time. A conflict will be detected, however, if each node monitors for conflicts after making a request. Both nodes may or may not detect a conflict, but at least one will. Because all nodes must respond to a broadcast request either by supplying the data or indicating they do not have a copy (or, under some circumstances, are not supplying the copy they have), the response can include an indication of a conflict, so conflicting nodes will detect the conflict.

Complications arise from allowing a node to use the data as soon as the data arrives rather than waiting for all responses. Thus, a node receiving a copy of the data is allowed to use the data internally immediately upon receipt, but may not make the effects of using the data visible to the rest of the system until the node has received a confirmation from Home. The confirmation may also include instructions that the node must forward its copy to another node, and perhaps evict the node from its own cache.

Finally, when a node responds to a request from another node by supplying the cached data, the node must defer all other requests it receives for the same cache line until the node receives a response from the Home node acknowledging the fact that the node forwarded the data, thus assuring that all nodes observe the same order of transfer of the (possibly writable) cache line.

The Home node is the respository for the uncached data, but the home node also may have a processor generating requests and include one or more caches. Like any other node, when the home nodes processor misses, the home node must broadcast requests to all other (peer) nodes, and the home node must handle the request internally as it would any other request arriving for the Home node. Note that this is a special case in that the home node does not explicitly send messages to itself (the Home node). In addition, when an external request arrives for data that is cached locally, the Home node must respond in a way to assure that a later response from the Home node is not ambiguous. That is, the home node may respond to the initial request by supplying the data, but the home node must also respond to the second request as the Home node.

Variants of the protocol allow the Home node to respond with the uncached copy of the data without knowing whether this data is valid, leaving it to the requesting node and the second response from the Home node to sort out the case where data was supplied inappropriately.

A more detailed, pseudo-code-based description of various embodiments of the MESIF protocol suitable for use as described herein are attached hereto as Appendix A.

Overview of Non-Speculative Distributed Conflict Resolution

In general, a cache coherency protocol requires conflict resolution in order to provide orderly changes of state for the various cache lines or other blocks of data. A conflict resolution technique described herein provides sequential consistency, which means that only a single, modifiable copy of a cache line can be present at any time, and that no copy of a cache line can be modified while other copies are readable. Conflicting requests to modify a copy of a cache line rust, therefore, be resolved in order to maintain sequential consistency.

In one embodiment, a conflict is resolved using the property of time. That is, regardless of delays, two nodes cannot both request a cache line before the other. Thus, conflicts can be detected by at least one of the conflicting requesters if each node monitors all requests after that node has made its own request.

In one embodiment, if a line is in the Exclusive (E), Modified (M) or Forward (F) state, conflicts are resolved at the node holding the unique copy. The winner of the conflict resolution, and possibly the losers, report the conflict to the home node, which pairs conflict reports and issues forwarding instructions to assure that all requesting nodes eventually receive the requested data. In one embodiment, if a requested cache line is either uncached or present only in the Shared (S) state, the home node for the requested cache line provides a copy of the requested data and resolves conflicts.

In one embodiment, the distributed conflict resolution described herein is part of a cache protocol referred to as the MESIF protocol in which one of five states is associated with a cached copy of a cache line (Modified, Exclusive, Shared, Invalid, Forward). In one embodiment, a blackout period after all responses for a request until an acknowledgement message has been received from the home node allows all conflicting nodes to be aware of conflicts in which the nodes are involved. The blackout period does not limit use of the data in the cache, but does prevent the data from being propagated to other caches.

The discussion that follows is provided in terms of nodes within a multi-node system. In one embodiment, a node includes a processor having an internal cache memory, an external cache memory and/or an external memory. In an alternate embodiment, a node is an electronic system (e.g., computer system, mobile device) interconnected with other electronic systems. Other types of node configurations can also be used. In the examples that follow, dashed lines represent messages previously sent and solid lines represent messages being described. In order to keep the figures more clear, when a set of messages (e.g., PRIL and corresponding IACK) are resolved, the lines representing the messages are no longer included in the figures.

Figure 2A:
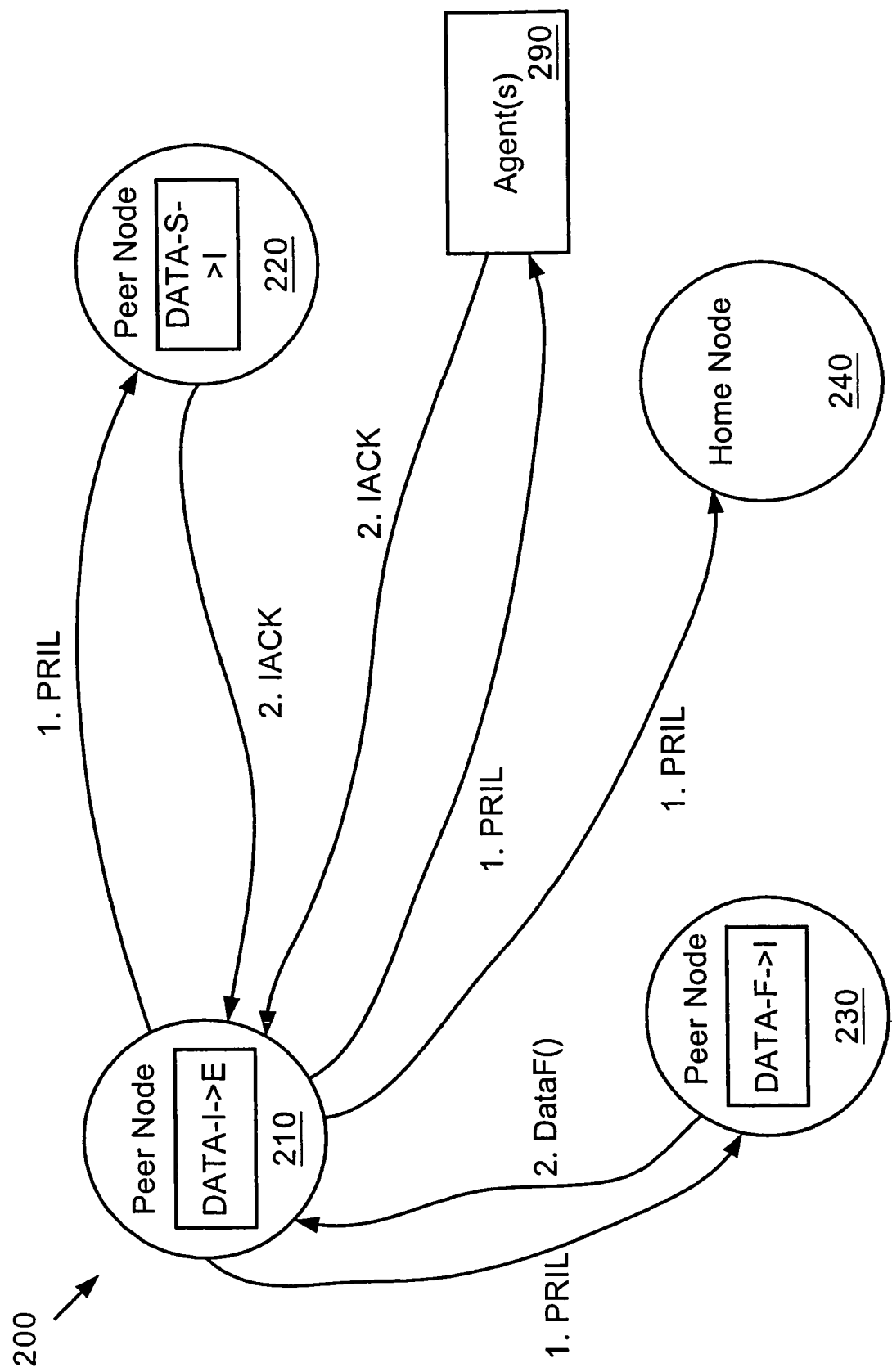
FIGS. 2a and 2b are conceptual illustrations of a request for a shared cached line.
Figure 2B:
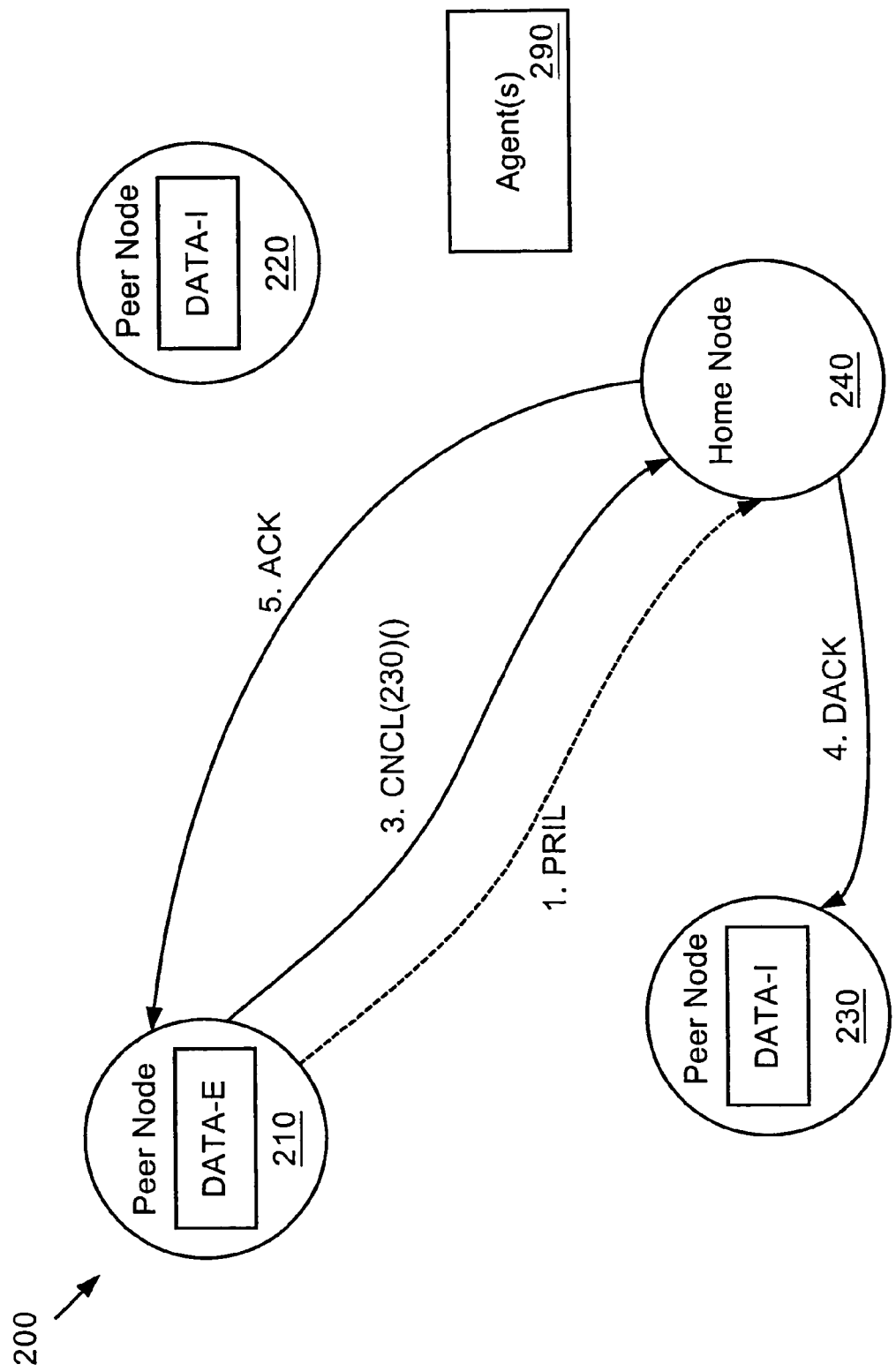

FIGS. 2a and 2b are conceptual illustrations of a request for a shared cached line. The numbering associated with the various messages of FIGS. 2a and 2b (e.g., 1. PRIL, 7. IACK) provide approximate ordering for purposes of explaining an example of a conflict. The exact timing relationships illustrated in FIGS. 2a and 2b, as well as the other examples provided (i.e., FIGS. 3a-3f) are not required.

As illustrated in FIG. 2a, peer node 210 transmits a PRIL message to peer nodes 220 and 230 and to home node 240. Peer node 210 could also request the same block of data using a PRL message, in which case peer node 230 would not invalidate its copy in response to the request message. Peer node 220 responds to the PRIL message with an IACK message indicating that peer node 220 cannot provide a valid copy of the requested data. Peer node 220 is illustrated as initially having a copy of the requested data in the S state, which is a valid copy of the data, but not a copy that can be provided in response to a request for a copy of the data.

Because a PRIL message requests a copy of data and causes all other copies to invalidate remaining copies of the data, peer node 220 transitions the copy of the data in the S state to the I state. Because peer node 230 has a copy of the requested data in the F state (the only valid copy to be provided to a requestor), peer node 230 provides a copy of the requested data to peer node 210. Peer node 230 also transitions its copy of the requested data to the I state. Peer node 210 stores the requested data in the E state. Alternatively, peer node 210 stores the requested data in the F state.

As illustrated in FIG. 2b, in response to receiving the requested data from peer node 230, peer node 210 sends a CNCL(230)( ) message to home node 240, which causes home node 240 to cancel retrieval of the requested data from memory (or to not transmit the data, if already retrieved). The CNCL(230)( ) message also indicates to home node 240 that a copy of the requested data was received from peer node 230 and that peer node 210 has not identified any conflicts with the PRIL message requesting the data.

In response to the CNCL(230)( ) message from peer node 210, home node 240 transmits an ACK message to peer node 210 and a DACK message to peer node 230. The ACK message indicates to peer node 210 that home node 240 acknowledges receipt of the CNCL(230)( ) message. The DACK message from peer node 240 to peer node 230 acknowledges receipt of the data by peer node 210 and concludes the process for requesting data by peer node 210.

Figure 3A:
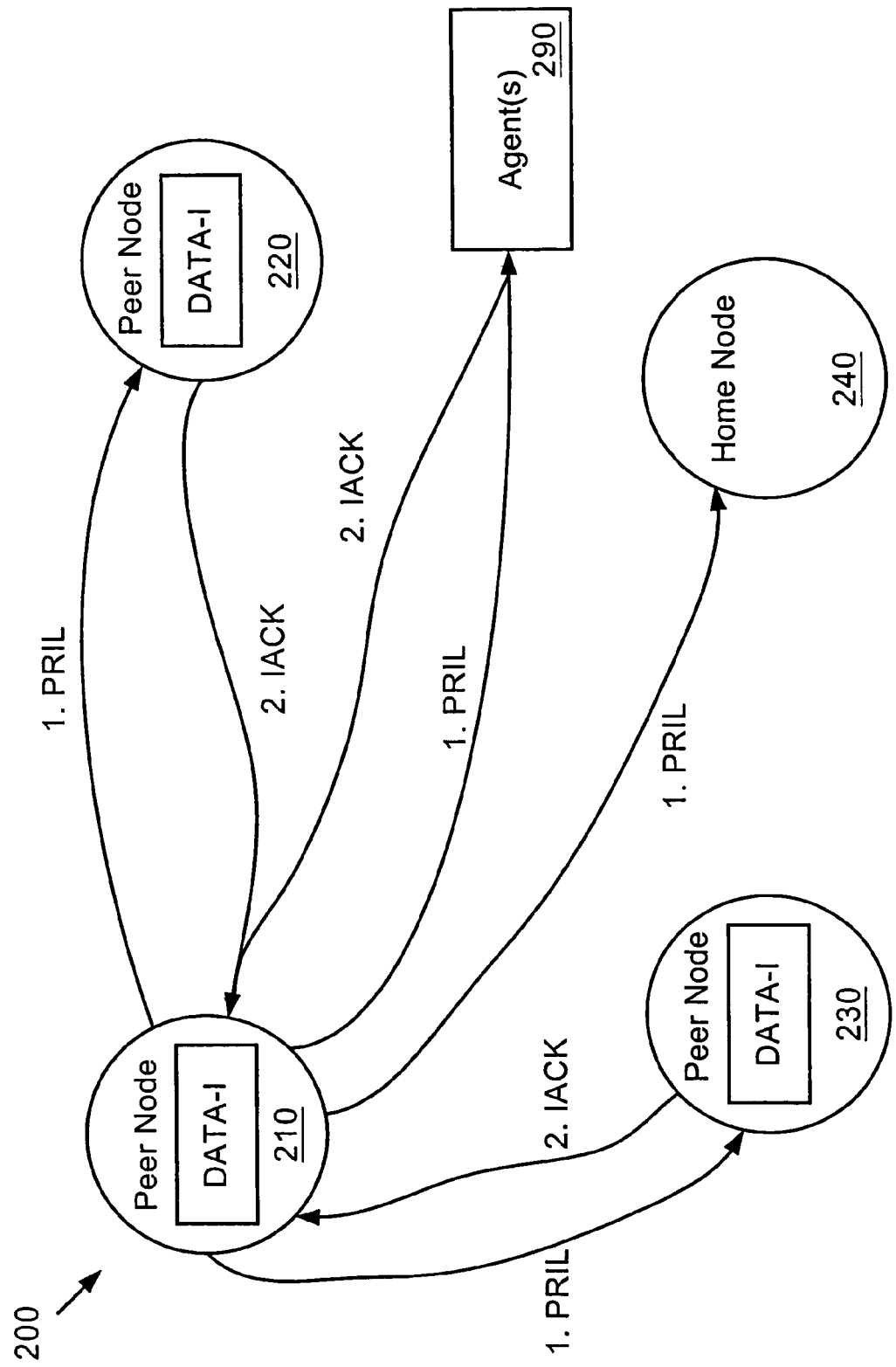
FIGS. 3a and 3b are conceptual illustrations of a request for a shared uncached line.
Figure 3B:
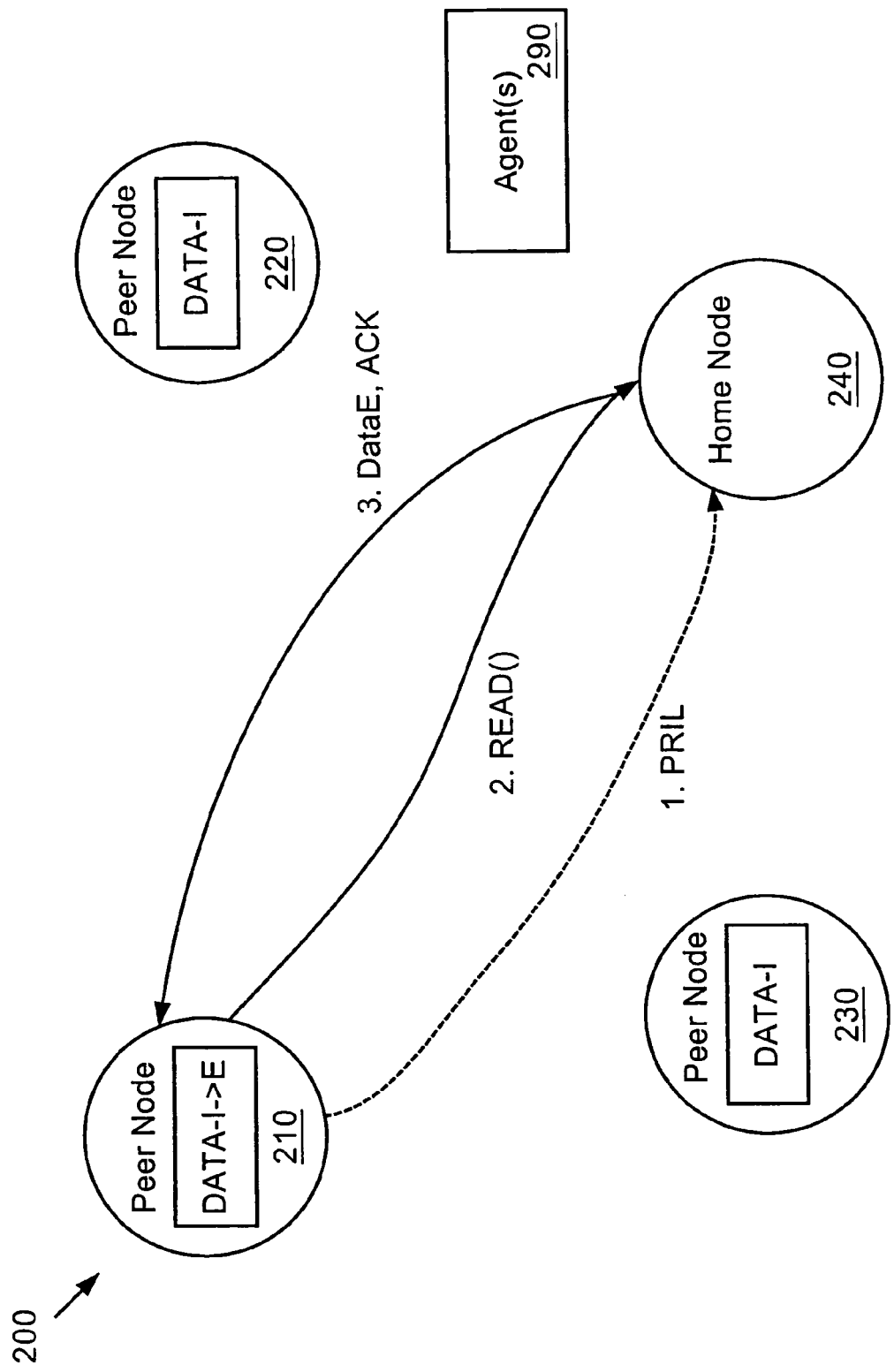

FIGS. 3a and 3b are conceptual illustrations of a request for a shared uncached line. As illustrated in FIG. 3a, peer node 210 transmits a PRIL message to request a copy of a block of data. Because peer nodes 220 and 230 do not store a valid copy of the requested data, nodes 220 and 230 respond with an IACK message.

As illustrated in FIG. 3b, because peer node 210 has received an IACK message from all peer nodes, peer node 210 sends a READ( ) message to home node 240, which requests a copy of the previously requested data that has been retrieved from memory by home node 240. The READ( )' message also indicates to home node 240 that peer node 210 has not identified any conflicts with the PRIL message. Home node 240 provides a copy of the requested data with a DataE message. In one embodiment, home node 240 also includes an ACK message with the DataE message (i.e., in the same message packet). In an alternate embodiment, the DataE and ACK messages are transmitted separately.

Figure 4A:
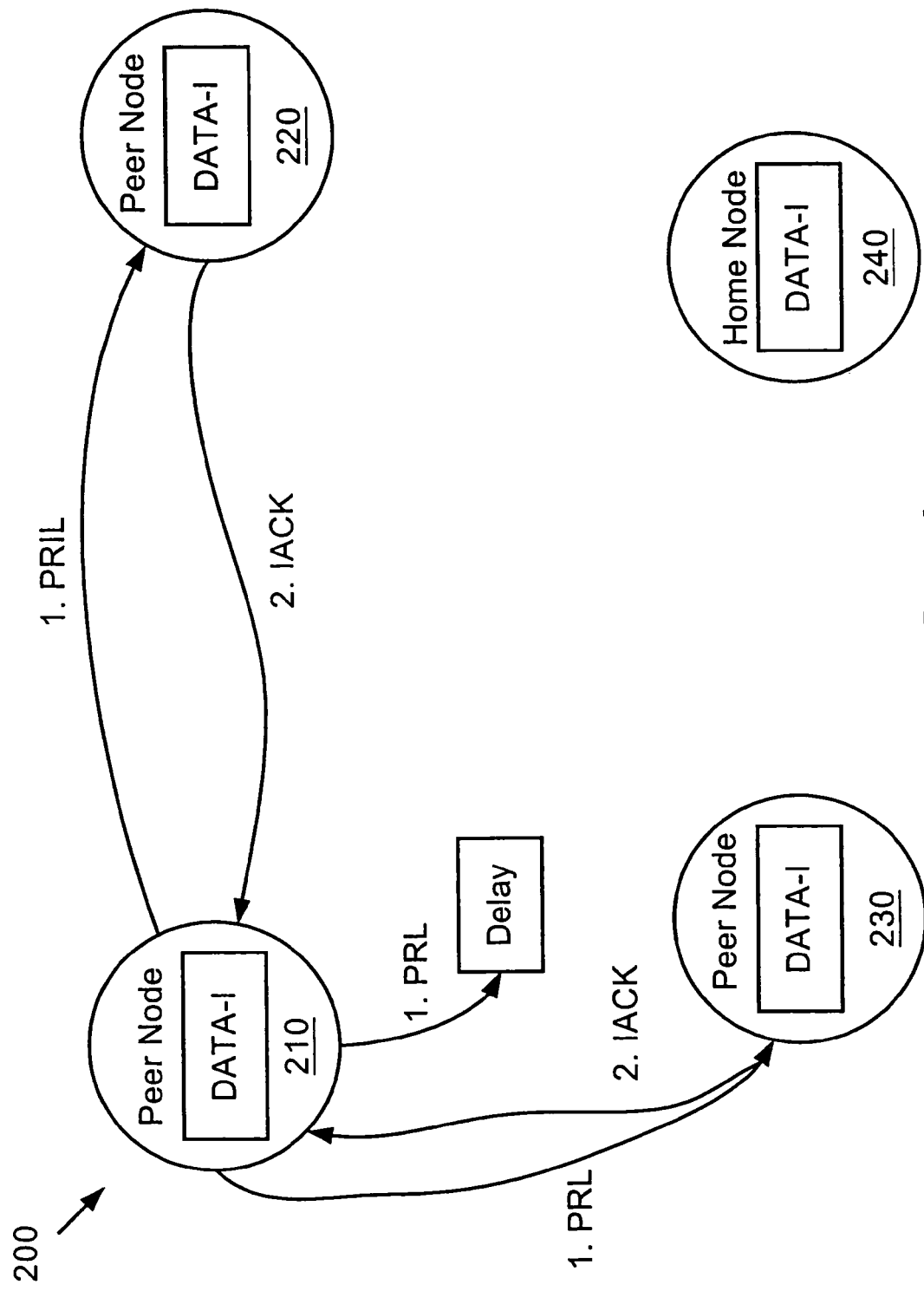
FIGS. 4a through 4f are conceptual illustrations of three-way conflicting requests for a shared line.

FIGS. 4a through 4f are a conceptual illustration of three-way conflicting requests for a shared, cached line. As illustrated in FIG. 4a, peer node 210 sends a PRL message to peer nodes 220 and 230 and to home node 240. The PRL message to home node 240 is delayed for some reason, for example, latency delays within system 200. In response to the PRL message, because neither peer node 220 nor peer node 230 can provide a valid copy of the requested data, peer node 220 and peer node 230 send IACK messages to peer node 210.

The PRL message from peer node 210 does not require any of the receiving peer nodes to invalidate copies, if any, stored by the receiving peer nodes. Peer node 210 can also use a PRIL message to request the data, which would require that all peer nodes storing the requested data, whether provided to the requesting node or not, to invalidate the copy of the requested data stored by the node. Conflicts can be caused by any combination of messages that would otherwise cause an inconsistent result.

Figure 4B:
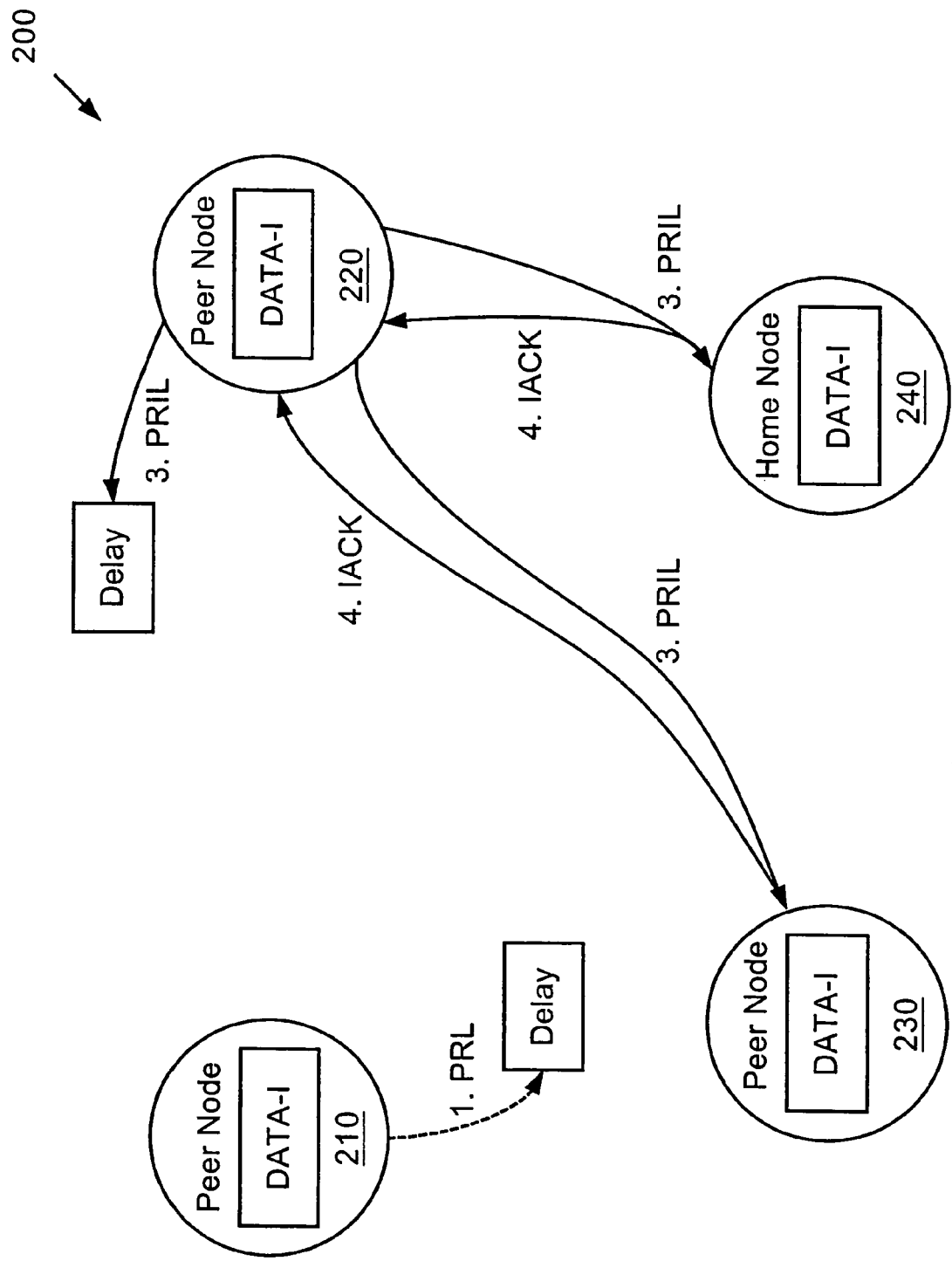

As illustrated in FIG. 4b, as some time after peer node 220 receives the PRL message from peer node 210 and before home node 240 receives the PRL message from peer node 210, peer node 220 transmits a PRIL message requesting the same block of data. Peer node 220 transmits the PRIL message to peer nodes 210 and 230 and to home node 240; however, the PRIL message to peer node 210 is delayed. Peer node 230 and home node 240 respond to the PRIL message from peer node 220 with IACK messages.

Figure 4C:
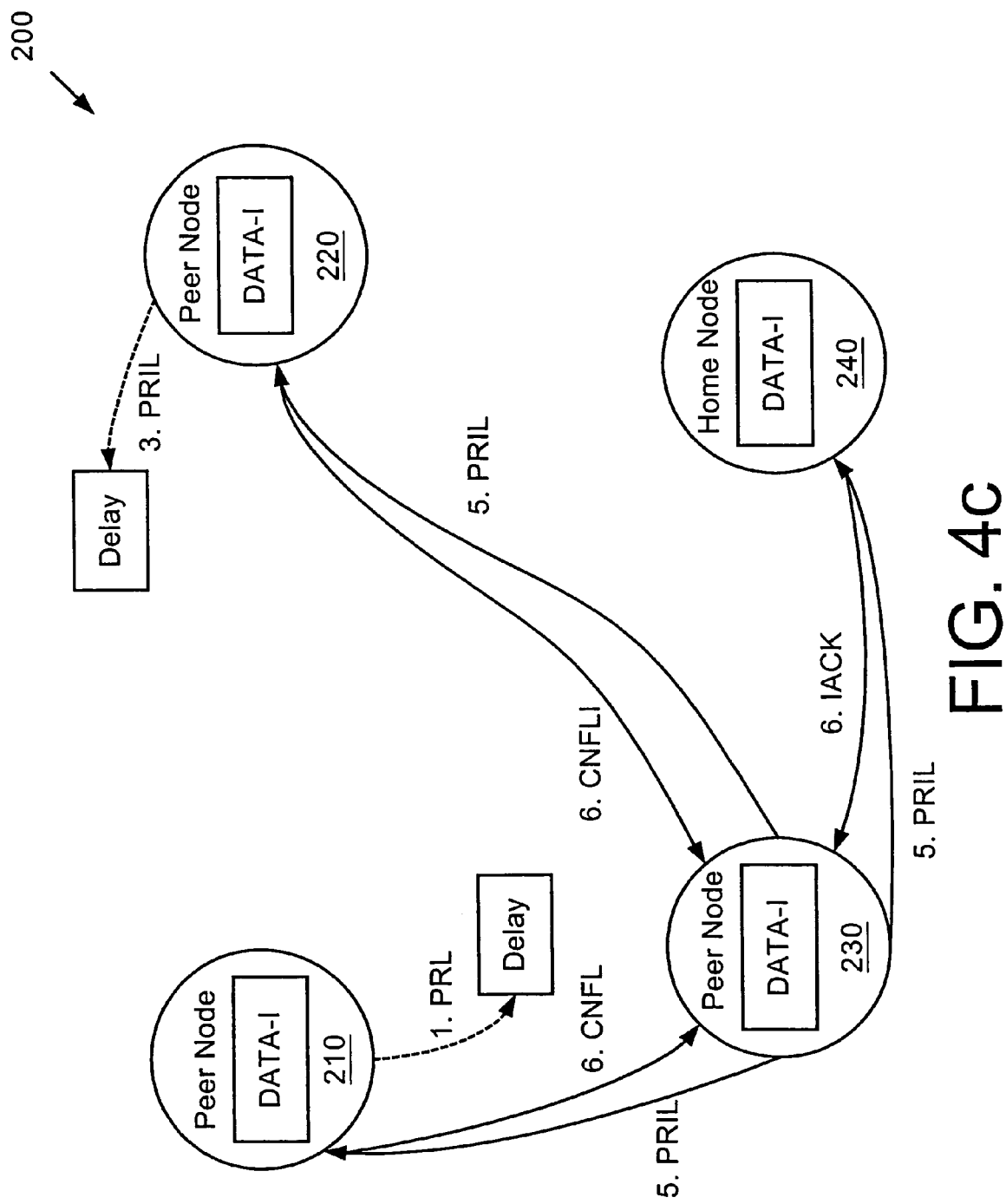

As illustrated in FIG. 4c, peer node 230 subsequently transmits a PRIL message to peer nodes 210 and 220 and to home node 240. Home node 240 responds to the PRIL message with an IACK message indicating that home node 240 does not store a valid copy of the requested data. Peer node 210 responds to the PRIL message from peer node 230 with a CNFL message indicating that peer node 210 has a conflict with the PRIL message received from peer node 230.

Peer node 220 responds to the PRIL message from peer node 230 with a CNFLI message indicating that peer node 220 has a conflict with the PRIL message received from peer node 230. The CNFLI message indicates that the conflicting message from peer node 220 is a PRIL message, which requires invalidation. The CNFL message from peer node 210 indicates that the conflicting message from peer node 210 is a PRL message, which does not require invalidation.

Figure 4D:
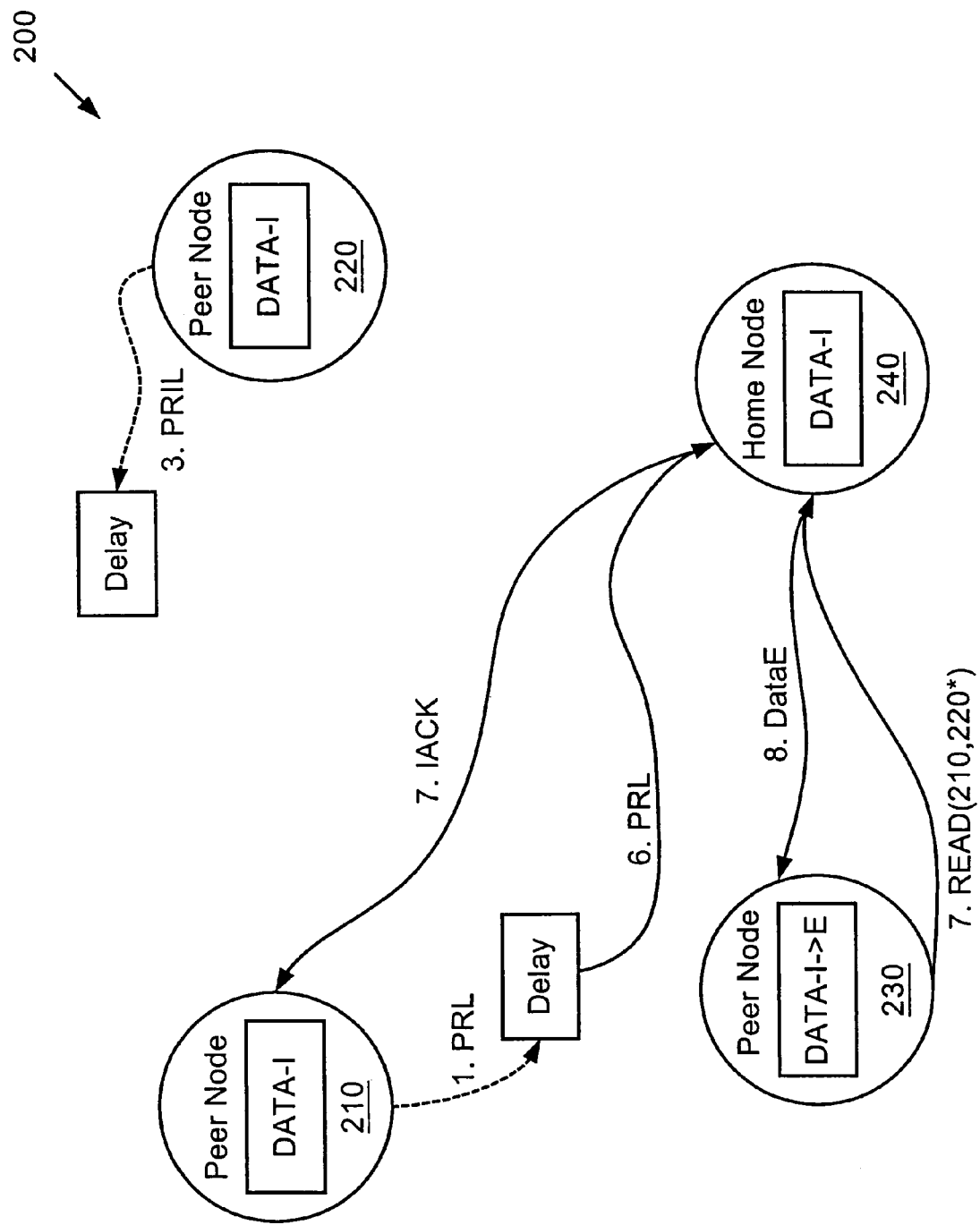

As illustrated in FIG. 4d, when home node 240 receives the delayed PRL message from peer node 210, home node 240 responds with an IACK message indicating that home node 240 does not have a valid copy of the requested data.

In response to receiving the CNFL message from peer node 210 and the CNFLI message from peer node 220, peer node 230 transmits a READ(210, 220*) message to home node 240. The READ(210, 220*) message requests a copy of the data from memory controlled by home node 240. The READ (210, 220*) message also indicates that the request for data from peer node 230 conflicts with requests from peer nodes 210 and 220 and that the request from peer node 220 requires invalidation (as indicated by the asterisk). Because peer node 230 is the first node with a conflicting request to send a READ message to home node 240, peer node 230 is the first peer node to received a copy of the requested data and is the current owner of the requested data.

In response to the READ(210, 220*) message, home node provides the requested data to Peer node 230 with a DataE message. The DataE message causes peer node 230 to store the data in the E state. Alternatively, other data messages (e.g., DataF, DataS) could be used. Home node 240 retains the conflict list provided by peer node 230 to respond to subsequent READ/CNCL messages from peer nodes 210 and 220.

Figure 4E:
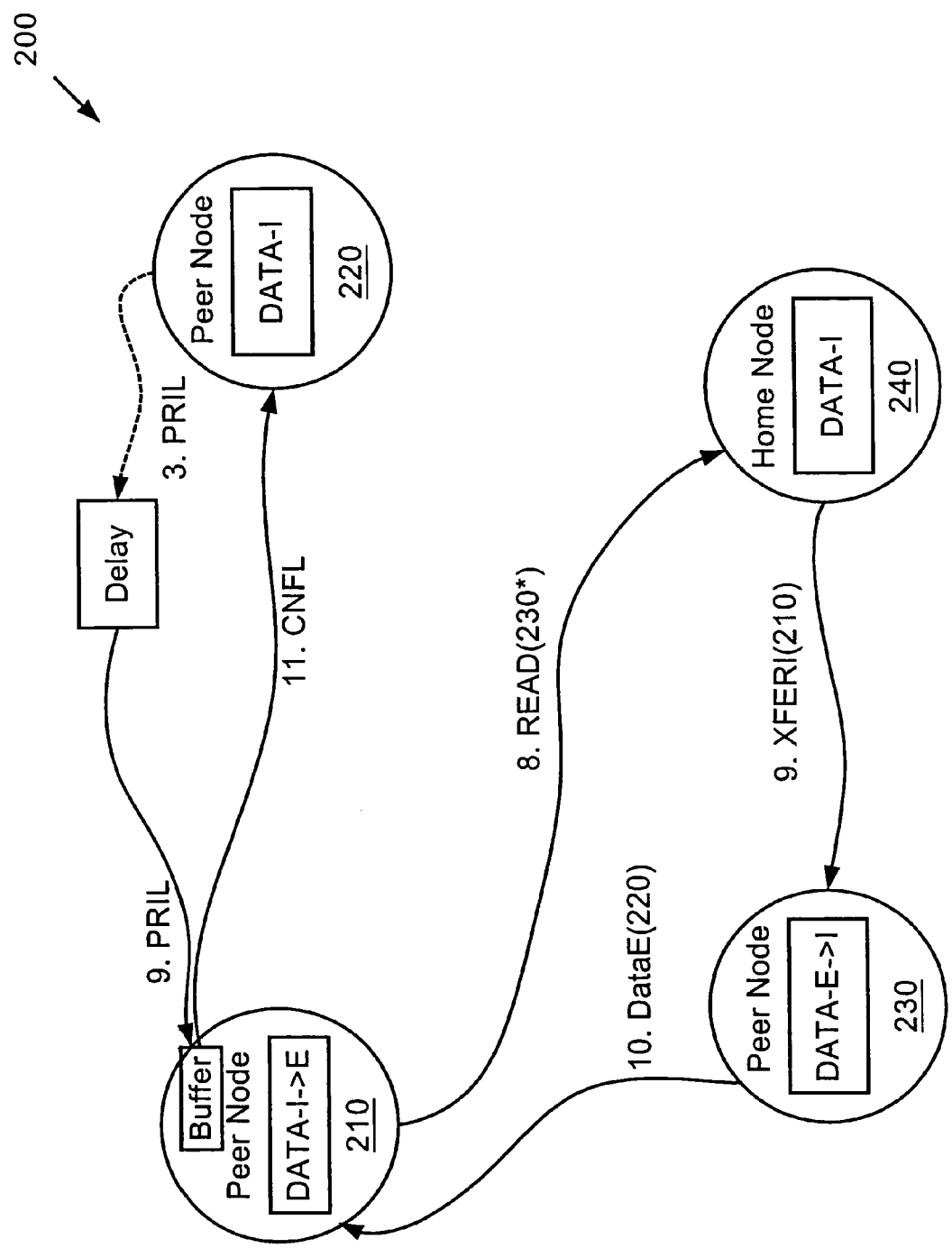

As illustrated in FIG. 4e, in response to the IACK message from home node 240, peer node 210 transmits a READ(230*) message to home node 240. The READ message does not indicate the conflict with the PRIL message from peer node 220 because peer node 210 has not received the PRIL message yet. If peer node 210 had received the PRIL message from peer node 220, the READ message would indicate a conflict with peer node 220.

In response to the READ(230*) message, home node 240 sends a XFRI(210) message to peer node 230, which causes peer node 230 to send the requested data to peer node 210. The XFRI message also indicates to peer node 230 that a conflicting message from a peer node that has not yet received its data (peer node 220) requires invalidation of the data after the data is sent to peer node 210.

Peer node 230 sends the requested data to peer node 210 with a DataE(220) message, which causes peer node 210 to store the requested data in the E mode, and informs peer node 210 that the requesting message might conflict with a message from peer node 220. Peer node 230 had detected the conflict with the message from peer node 220. Before peer node 210 receives the requested data, the delayed PRIL message is received from peer node 220.

Because peer node 210 has already delivered its list of conflicts to home node 240 and has not received the requested data from peer node 230, peer node 210 stores the PRIL message received from peer node 220 in a buffer. In response to receiving the Data message from peer node 230 containing the conflict with peer node 220, peer node 210 responds with a CNFL message indicating that peer node 210 has a conflict with the PRIL message from peer node 220.

Figure 4F:
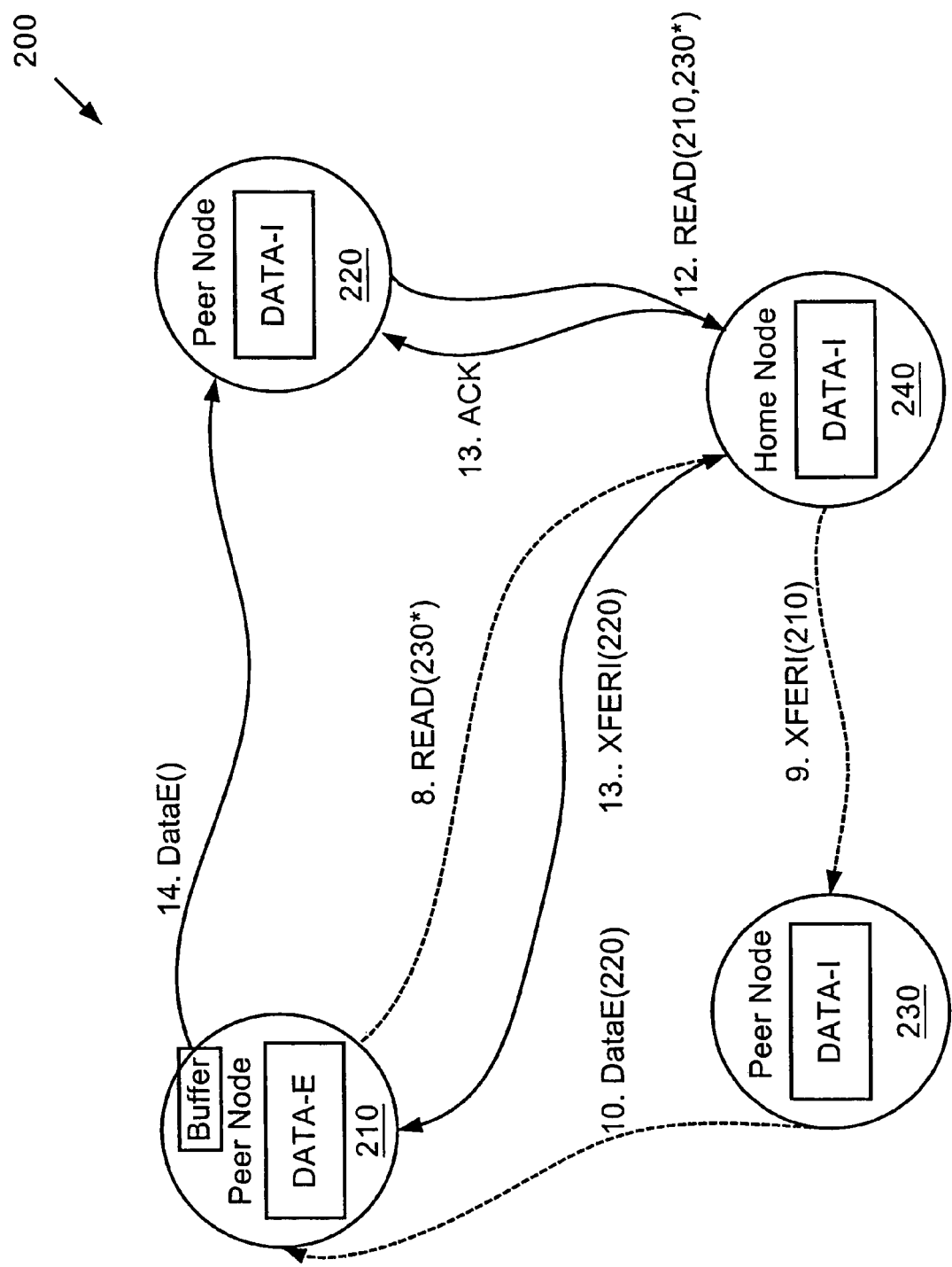

As illustrated in FIG. 4f, in response to the CNFL message from peer node 210, peer node 230 sends a READ(210,230*) message to home node 240, which indicates a conflict with the PRL message from peer node 210 and the PRIL message from peer node 230. Home node 240 responds to the READ (210,230*) message with an ACK message to peer node 220 and a XFRI(220) message to peer node 210. Peer node 210 sends the requested data to peer node 220 with a DataE(230) message. Peer node 220 previously detected the conflict with peer node 230. Delivery of the ACK message to peer node 220 indicates that no further conflicts exist with the PRIL message from peer node 220.

Figure 5A:
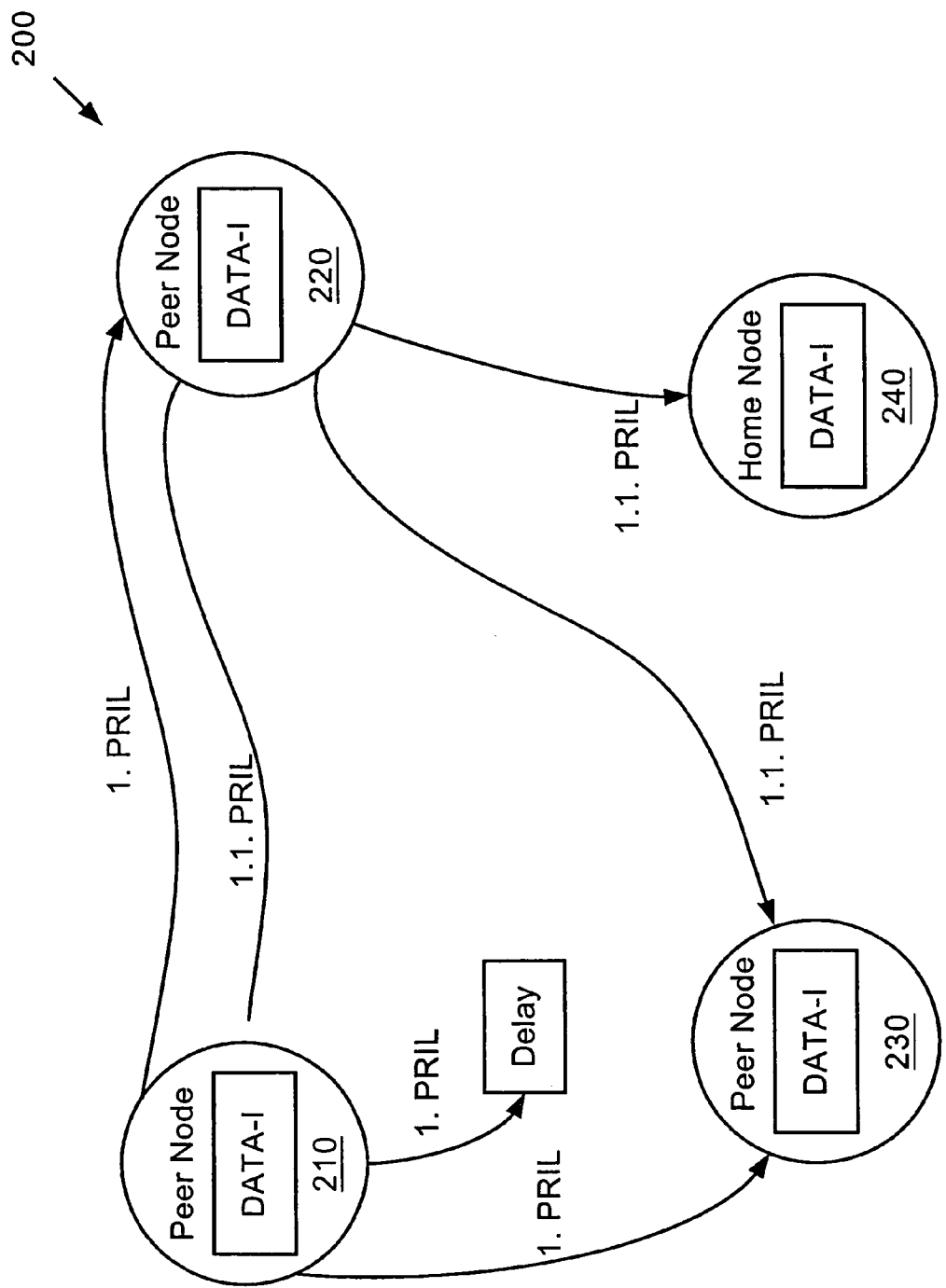
FIGS. 5a through 5g are conceptual illustrations of three-way conflicting requests for a shared line.

FIGS. 5a through 5g are conceptual illustrations of three-way conflicting requests for a uncached line. As illustrated in FIG. 5a, peer node 210 transmits a PRIL message to peer nodes 220 and 230 and to home node 240 to request a block of data. The PRIL message for home node 240 is delayed. Soon after peer node 210 transmits a PRIL message, peer node 220 transmits a PRIL message to peer nodes 210 and 230 and to home node 240 requesting a copy of the same block of data.

Figure 5B:
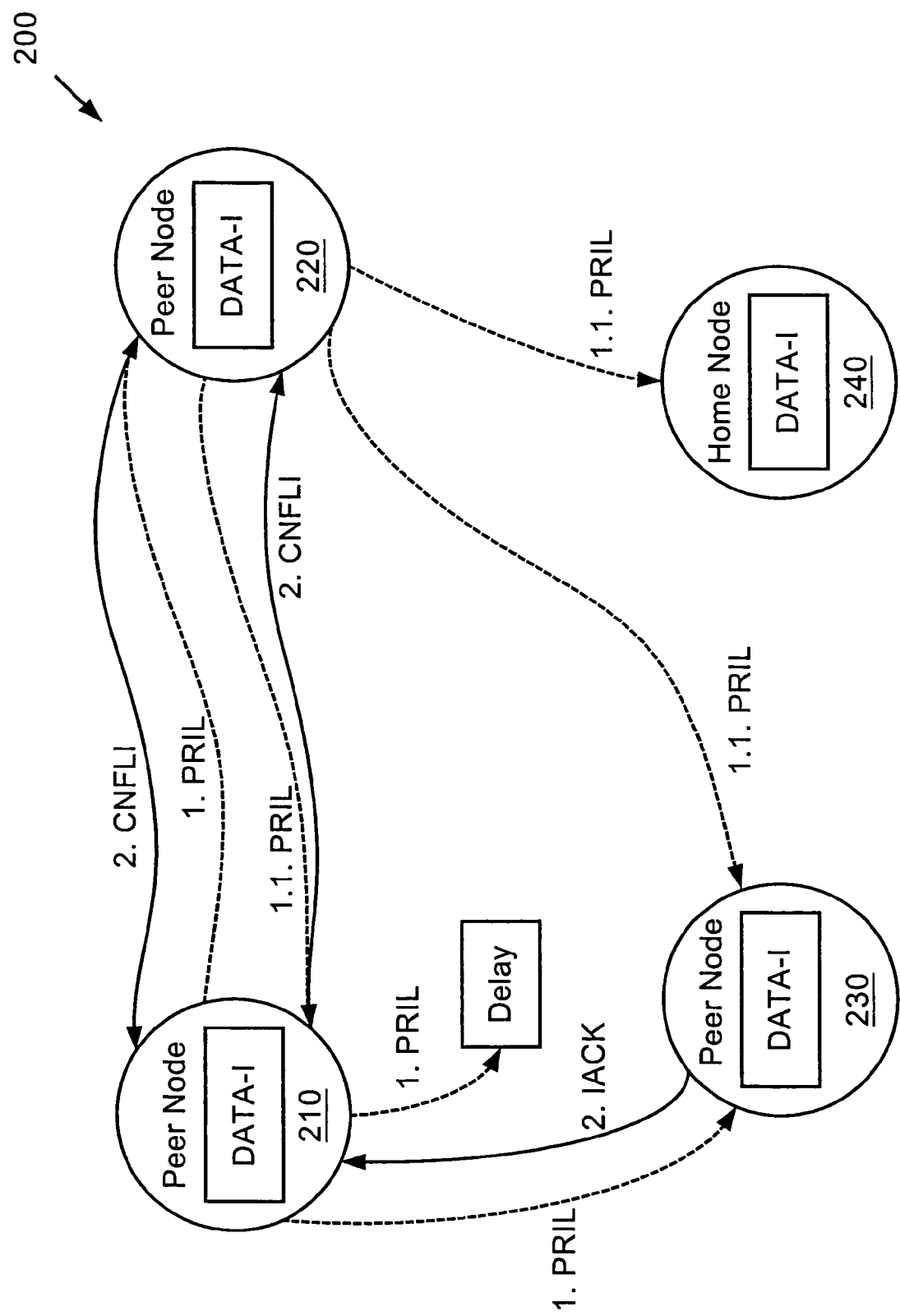

As illustrated in FIG. 5b, peer node 230 responds to the PRIL message from peer node 210 with an IACK message. Peer node 230 indicates a delay in processing its response to the PRIL message from peer node 220. Peer node 210 responds to the PRIL message from peer node 220 with a CNFLI message. Similarly, peer node 220 responds to the PRIL message from peer node 210 with a CNFLI message.

Figure 5C:
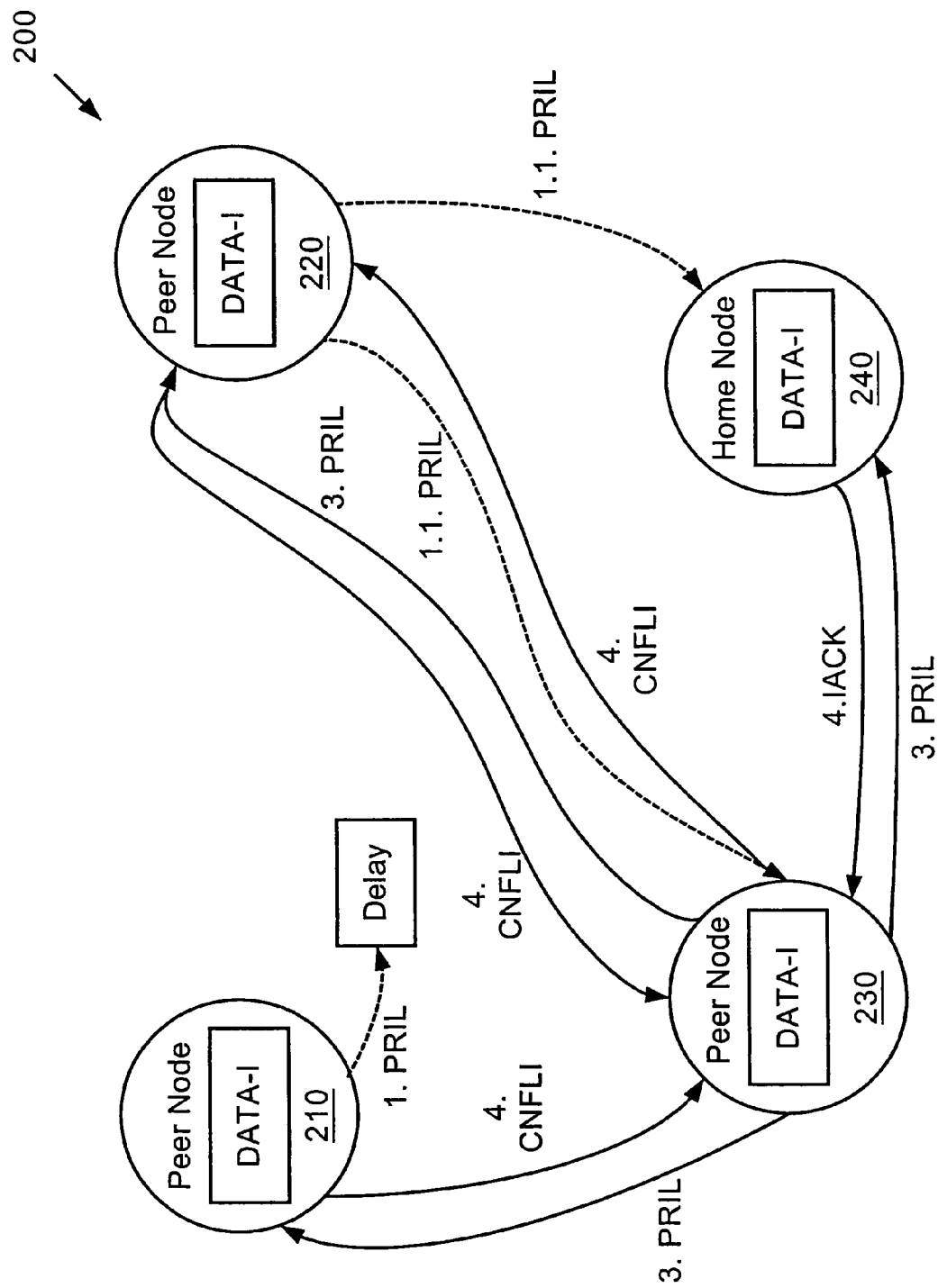

As illustrated in FIG. 5c, before nodes 210 and 220 receive a copy of the requested data, peer node 230 transmits a PRIL message to peer nodes 210 and 220 and to home node 240. Peer nodes 210 and 220 respond to the PRIL message from peer node 230 with CNFLI messages. Due to its delay in processing the PRIL from peer node 220, peer node 230 sends a CNFLI message, instead of an IACK message, to peer node 220 to indicate a conflict with the newly generated request for the same block of data by peer node 230.

Figure 5D:
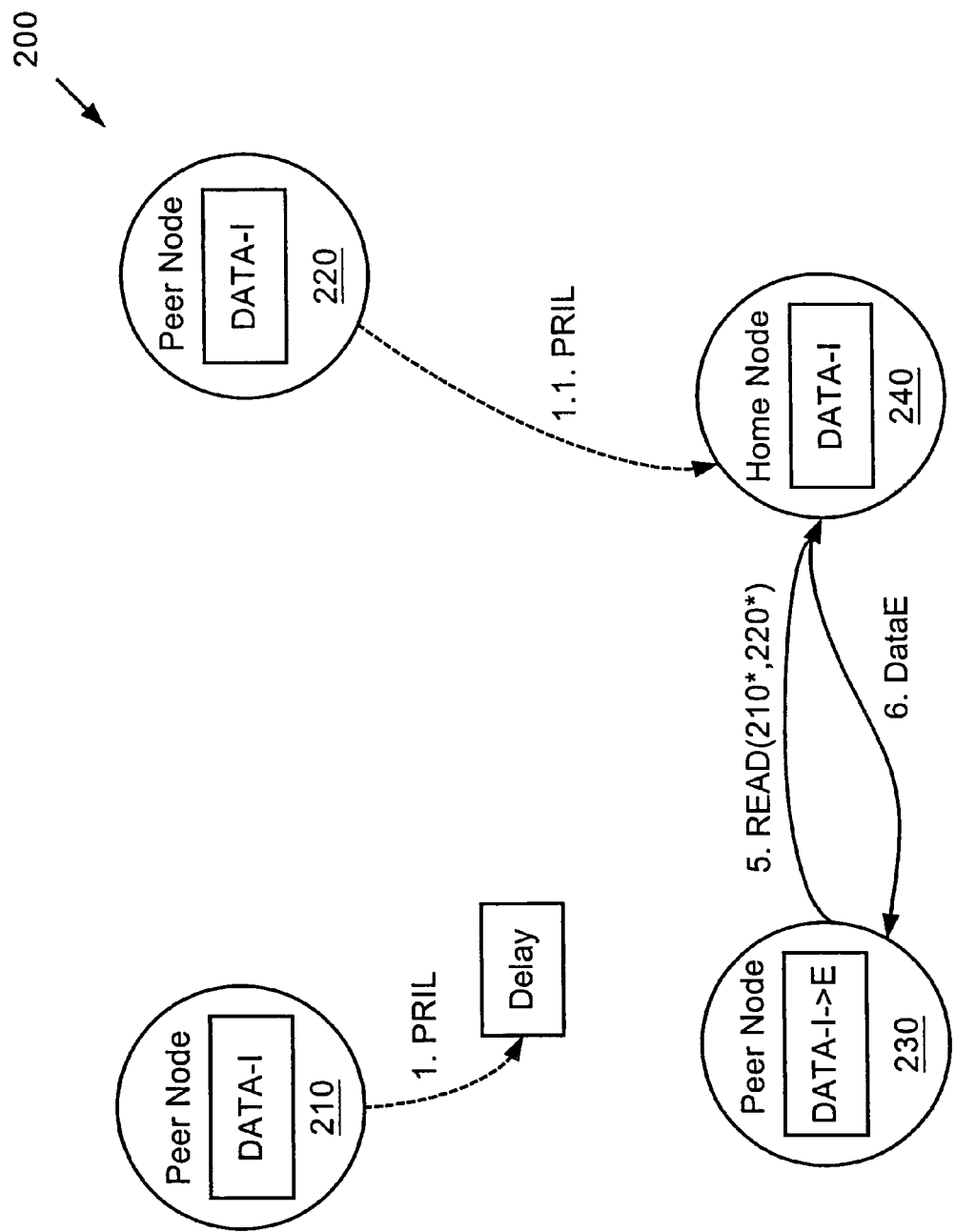

As illustrated in FIG. 5d, after receiving responses from all peer nodes, peer node 230 sends a READ(210*,220*) message to home node 240. Home node 240 responds with a DataE message to provide the requested data to peer node 230 because peer node 230 is the first peer node to send a READ message to home node 240. Peer node 230 is the current owner of the data.

Figure 5E:
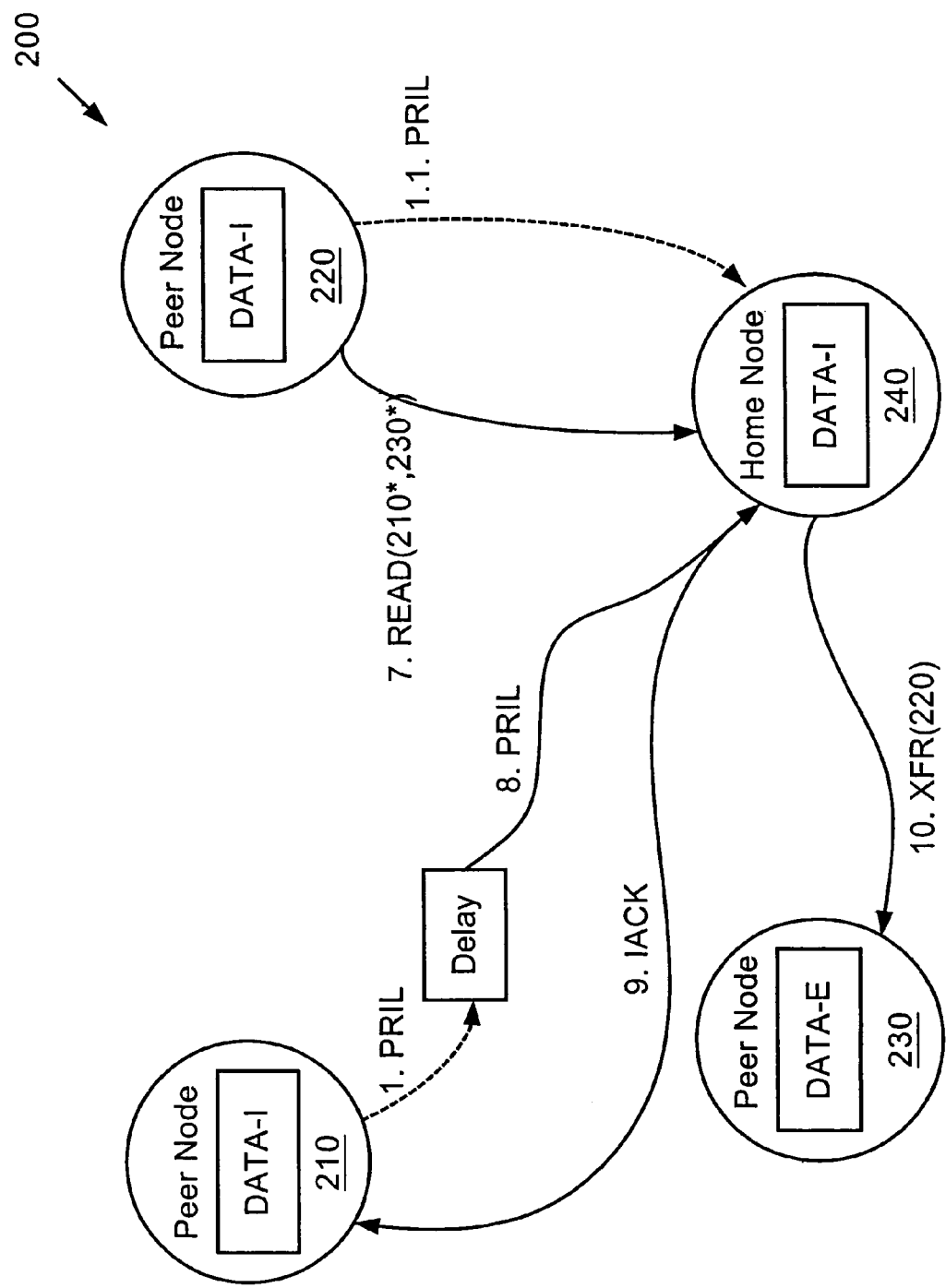

As illustrated in FIG. 5e, after receiving responses from all peer nodes, peer node 210 sends a READ(210*,230*) message to home node 240. Home node 240 also receives the delayed PRIL message from peer node 210. Home node 240 responds to the PRIL message from peer node 210 with an IACK message, which indicates that home node 240 will not provide a copy of the requested data. This is because peer node 230 has a valid, cached copy of the requested data.

Home node 240 sends a XFRI(220) message to peer node 230 to cause peer node 230 to provide a copy of the requested data to peer node 210. Peer node 230 is the second peer node to receive a copy of the requested data because peer node 230 is the second peer node to send a READ message to home node 240 requesting the data.

Figure 5F:
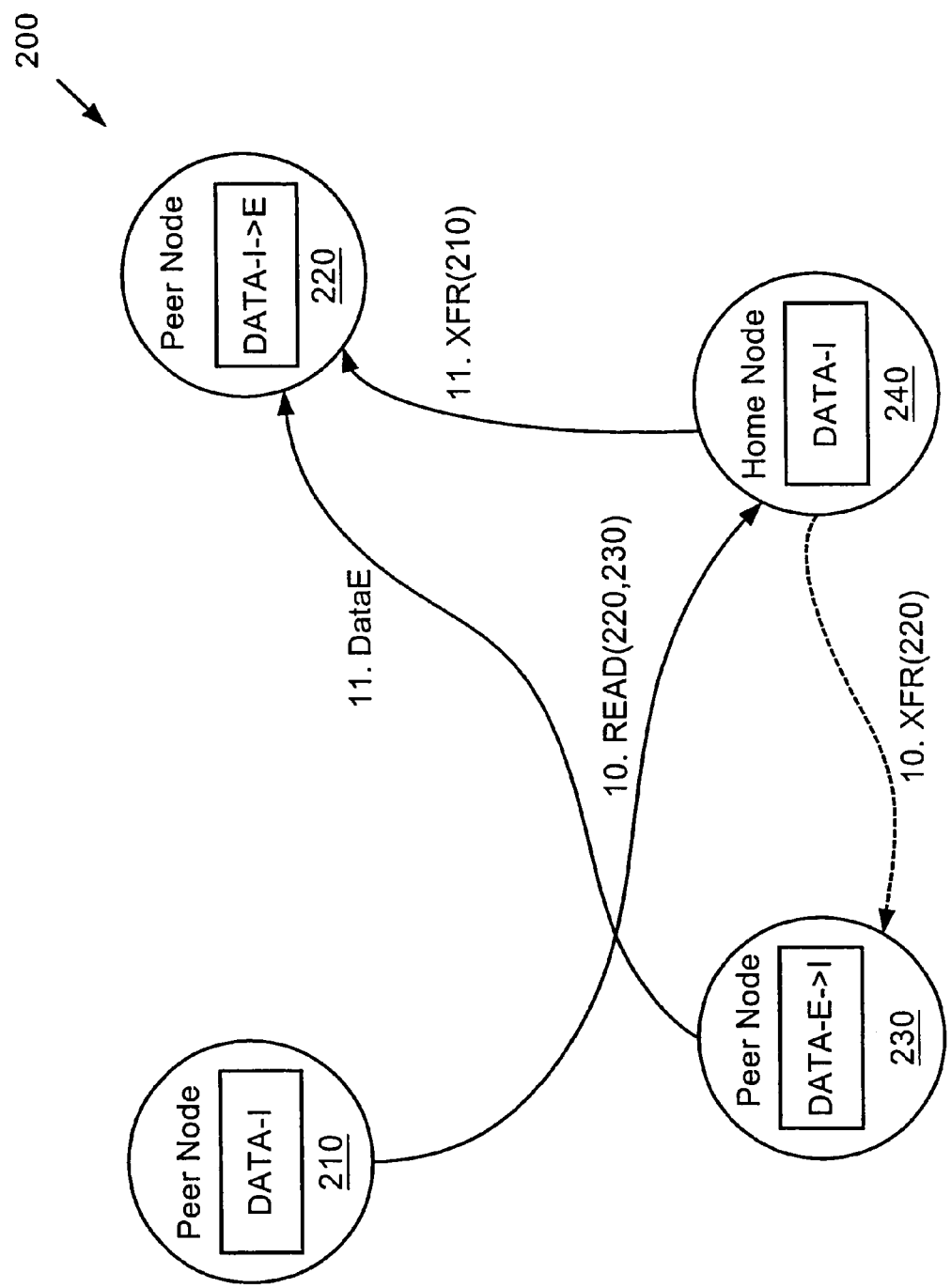

As illustrated in FIG. 5f, peer node 230 sends a copy of the requested data to peer node 220 with a DataE message. Peer node 210 sends a READ(220*, 230*) message to home node 240. Home node 240 responds to the READ message from peer node 210 by sending a XFRI(210) message to peer node 220, which causes peer node 220 to send a copy of the requested data to peer node 210.

Figure 5G:
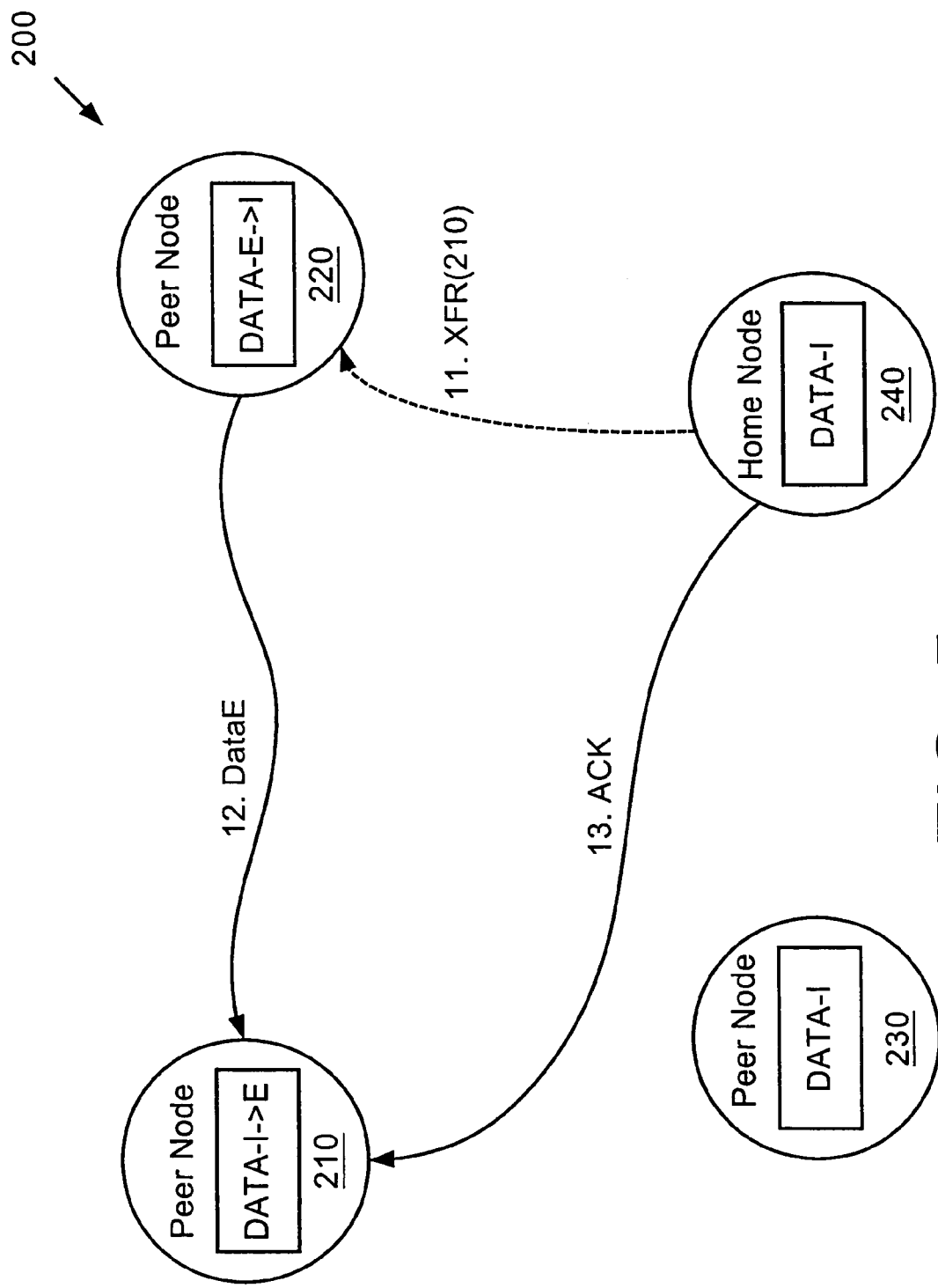

As illustrated in FIG. 5g, peer node 220 sends a copy of the requested data to peer node 210 with a DataE message. Peer node 220 also invalidates the copy of the data stored by peer node 220. Home node 240 sends an ACK message to peer node 210 to indicate that all requests for the block of data have been resolved and satisfied.

Example Systems to Support Non-Speculative Distributed Conflict Resolution

Figure 6:
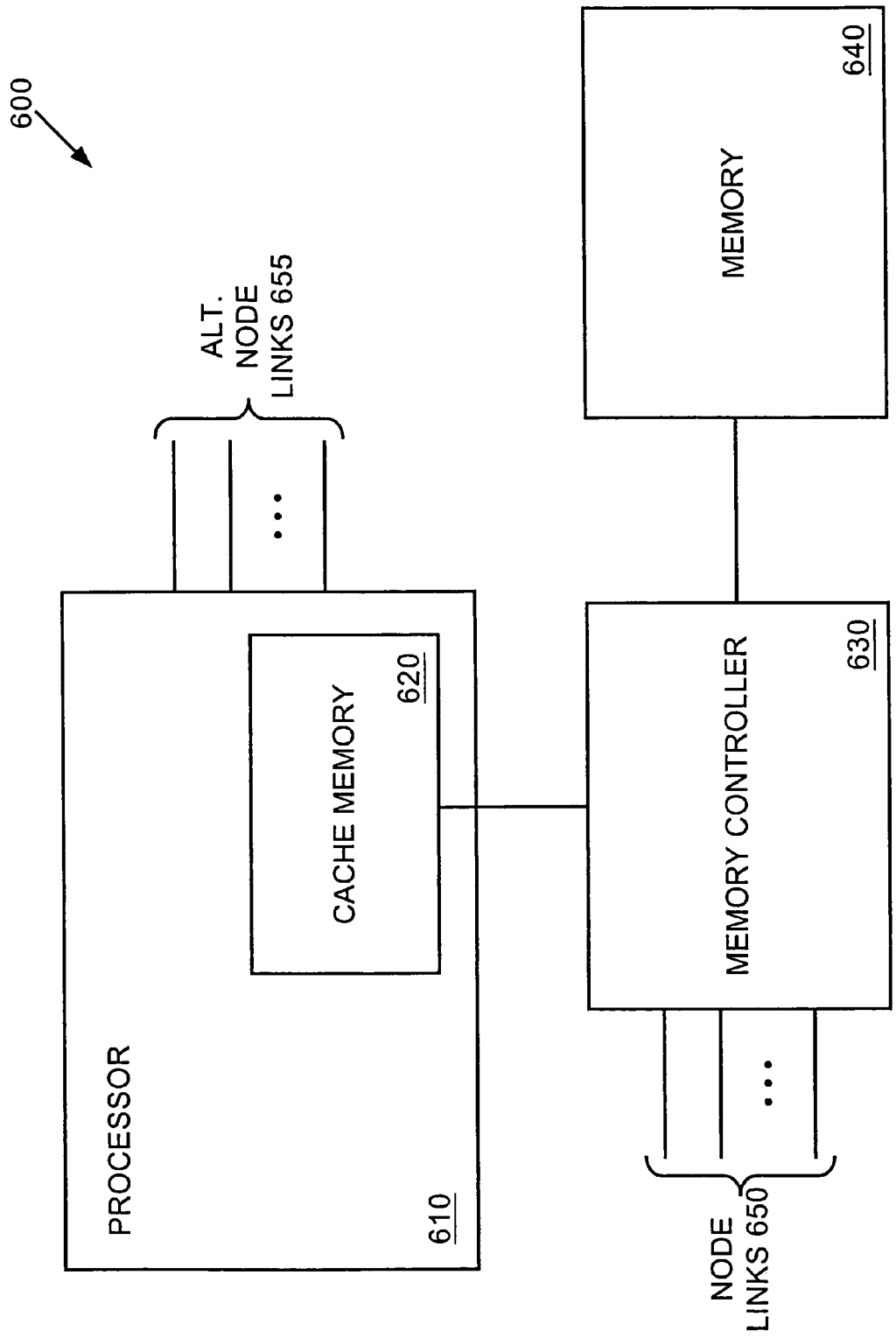
FIG. 6 is a block diagram of one embodiment of a node.

FIG. 6 is a block diagram of one embodiment of a node. Node 600 is illustrated with a single processor, cache memory, memory controller and memory; however, any number of any of these components can be included in a node. Further, additional and/or different components (e.g., a bus bridge) can also be included in a node.

Processor 610 can be any type of processor known in the art. In one embodiment, processor 610 includes cache memory 620. In alternate embodiments, cache memory 620 is external to processor 610, or additional cache memories can be included that are internal or external to processor 610.

Memory controller 630 is coupled with cache memory 620 and memory 640. Memory controller 630 operates as an interface between cache memory 620 and memory 640. In one embodiment, memory controller 630 maintains cache coherency according to the cache coherency protocol described herein. Memory controller 630 interacts with other nodes via node links 650. In an alternate embodiment, processor 610 interacts with memory controller 630 to maintain cache coherency as described herein and processor 610 interacts with other nodes via alternative node links 655.

In one embodiment, node links 650 include a dedicated interface for each node with which node 600 interacts. In an alternate embodiment, node links 650 include a number of interfaces that is different than the number of nodes with which node 600 interacts. In one embodiment, node 600 interacts with one or more agents that represent multiple nodes.

Figure 7:
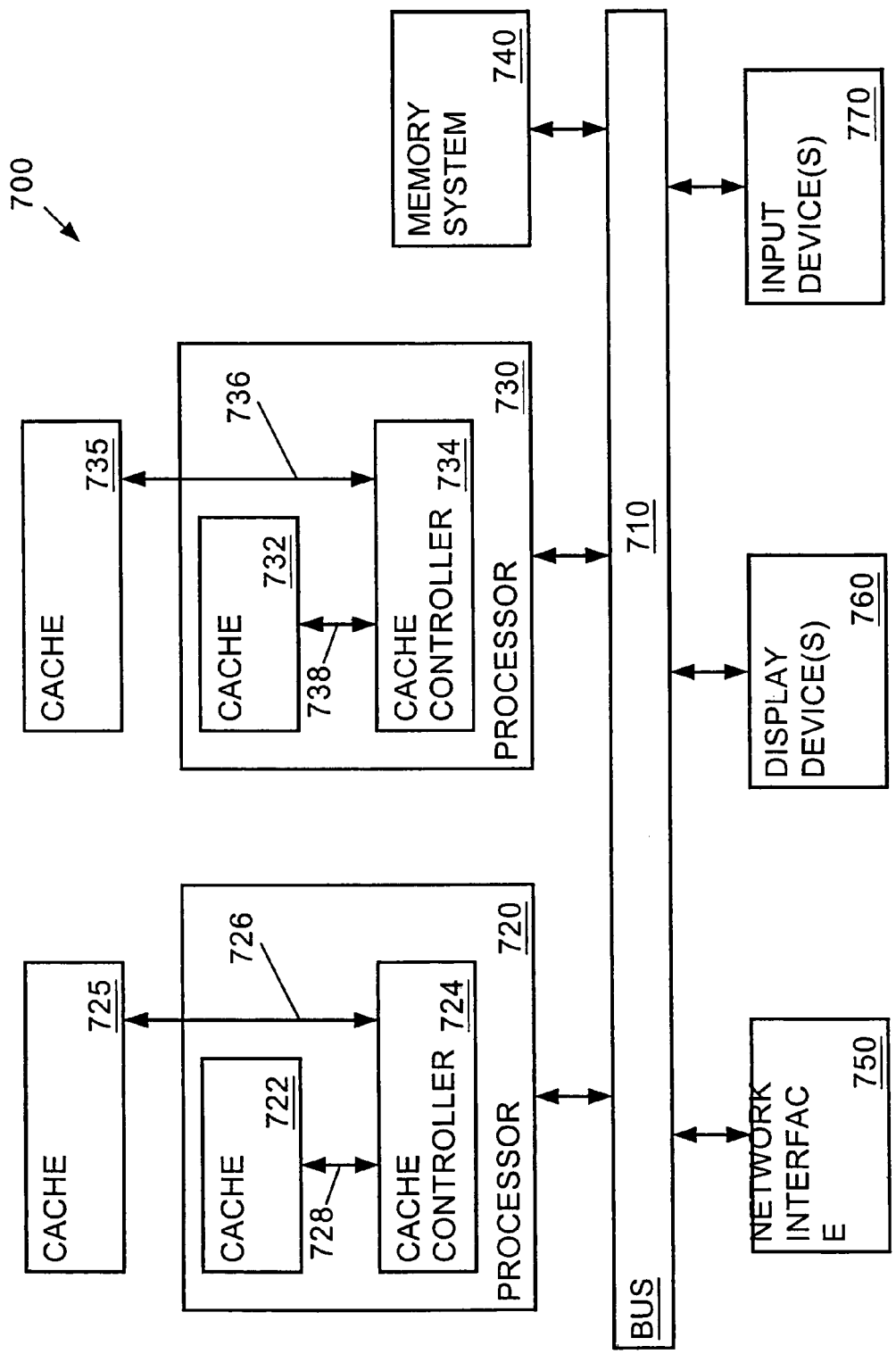
FIG. 7 is one embodiment of a multiprocessor system.

FIG. 7 is one embodiment of a multiprocessor system. Multiprocessor system 700 is intended to represent a range of systems having multiple processors, for example, computer systems, real-time monitoring systems, etc. Alternative multiprocessor systems can include more, fewer and/or different components. In certain situations, the cache management techniques described herein can be applied to both single processor and to multiprocessor systems. Multiprocessor system 700 can be configured to operate as a multi-node system.

Multiprocessor system 700 includes bus system 710 or other communication device(s) to communicate information. Bus system 710 can include any number of buses and associated interconnection circuitry, for example, bus bridges. Processor 720 is coupled with bus system 710 to process information. Processor 720 can include cache memory 722, for example a level zero (L0) cache memory, and cache controller 724. In one embodiment, processor 720 is also coupled with cache 725, which can be any type of cache memory. In an alternate embodiment, cache 725 can be coupled with bus system 710. Other types of processor-cache configurations can also be used.

In one embodiment, cache controller 724 is coupled with cache memory 722 via cache memory interface 728, which can be, for example, a bus internal to processor 720. Cache controller is coupled with cache memory 725 via cache interface 726, which provides an interface between processor 720 and an external cache memory.

Multiprocessor system 700 further includes processor 730 with cache memory 732 and cache controller 734. Cache controller 734 is coupled with cache memory 732 via cache interface 738. Similarly, cache controller 734 is coupled with cache memory 735 via cache interface 736. In one embodiment, cache memory 735 is coupled with processor 730.

While multiprocessor system 700 is illustrated with two processors, multiprocessor system 700 can include any number of processors and/or co-processors. Multiprocessor system 700 further includes memory system 740 coupled with bus system 710. Memory system 740 can include any combination of dynamic (e.g., random access memory) and static (e.g., read-only memory, CD-ROM, disk storage, flash memory) memory devices and associated drives, where appropriate. The memory devices of memory system 740 are used to store information and instructions to be executed by processors of multiprocessor system 700. Memory system 740 also can be used to store temporary variables or other intermediate information during execution of instructions by the processors.

Instructions can be provided to memory system 740 from a static or remote storage device, such as magnetic disk, a read-only memory (ROM) integrated circuit, CD-ROM, DVD, via a remote connection that is either wired or wireless, etc. In alternative embodiments, hard-wired circuitry can be used in place of or in combination with software instructions. Thus, execution of sequences of instructions is not limited to any specific combination of hardware circuitry and software instructions.

Multiprocessor system 700 further includes network interface 750 to provide access to a network, such as a local area network and/or the Internet. Network interface 750 can provide wireless and/or wired network interfaces, which can include communication of instructions to and/or from remote electronically-accessible media. An electronically-accessible medium includes any mechanism that provides (i.e., stores and/or transmits) content (e.g., computer executable instructions) in a form readable by an electronic device (e.g., a computer, a personal digital assistant, a cellular telephone).

For example, a machine-accessible medium includes read only memory (ROM); random access memory (RAM); magnetic disk storage media; optical storage media; flash memory devices; electrical, optical, acoustical or other form of propagated signals (e.g., carrier waves, infrared signals, digital signals).

Multiprocessor system 700 can also include display device 760, such as a cathode ray tube (CRT) or liquid crystal display (LCD), to display information. Input device(s) 770, including, for example, a keyboard having alphanumeric and other keys, is typically coupled to bus 710 to communicate information and command selections to processors 720 and/or 730. Another type of user input device is a cursor control device, such as a mouse, a trackball, or cursor direction keys to communicate direction information and command selections to processors 720 and 730 and to control cursor movement on display device 760.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

APPENDIX A

Below are example descriptions of MESIF algorithms in pseudo-code format. Descriptions are packet-based; i.e., each routine is executed in response to an incoming or outgoing packet. Alternatively, the algorithms can be described as a reaction to a state change due to a packet being received or generated.

To simplify the descriptions, the following assumptions are made:

1. Each peer/requester node has a single caching agent;
2. Home nodes do not have caching agents; and 3. Algorithms for memory requests in home nodes can be more complex than indicated and handle all of the corner cases MESIF induces (more than one read, multiple epochs, write forwarding, etc.).

The case of a home node having a caching agent (as can occur in some embodiments) is derived from the given algorithms, namely, by combining the routines for received packets by internalizing routines involving transmissions to/from the home node by a local caching agent (or proxy).

In one embodiment, caches obey the following constraints:
1. Cache will generate PRL only if line is in I state.
2. Cache will generate PRIL only if line is in I or S state.
3. Cache will generate PWL only if line is in M state.
4. Cache may freely transition to I state from S, F, and E states.
5. Cache may freely transition to M state from E state (presuming a write occurred.)
6. Cache may otherwise transition only upon completion of a request it issued or in receipt of a request from a peer.

The base protocol described below covers only PRL, PRIL, and PWL requests and uses the conflict resolution method involving a conflict list being passed along with transferred data. Extensions and options to this base protocol are covered in the following sections.

Base MESIF Protocol

Request Generation
  Invocation:
  Cache generated new request for an (inactive) address
  Algorithm:

```
Mark address as being active
If request is PRL or PRIL
    Send request to all other peer nodes and to home node
If request is PWL
    Send request to home node
```

Request Reception by Home Node
  Invocation:
  Request received at home node
  Algorithm:

```
If request is PWL
    Initiate write to memory
    (Handle forwarding, canceling outstanding reads, etc.)
    Send ACK back to requester
If request is PRL or PRIL
    Initiate read from memory
    (Buffer data if read finishes before a READ is received, etc.)
```

Request Reception by Peer Node
  Invocation:
  Request (PRL or PRIL) received at a peer node
  Algorithm:

```
If address is being forwarded
    Buffer incoming request
Else if address is not active
    Snoop cache
Else if address is active
    If active request is a PWL
        Buffer incoming request
    -- End If
    If incoming request is in active request's conflict list
        If active request is a PRL
            Respond with CNFL
        Else (active request is a PRIL)
            Respond with CNFLI
    Else if active request is in "data phase" (see Gathering
        Responses below)
        Buffer incoming request
    Else
        Add requester to conflict list (of active request)
        If incoming request is a PRIL
            Mark requester in conflict list as a PRIL conflictor
        If active request is a PRL
            Respond with CNFL
        Else (active request is a PRIL)
            Respond with CNFLI
```

Snoop Responses
  Invocation:
  Request submitted (as a snoop) to cache for proper response generation
  Algorithm:
  Look up response and next state in table below based upon current cache state and incoming request type (next state of S/I means the cache can move the line to either state; note: still send DATA_F for PRLs even if invalidating local copy—see PRL DATA_E/M Reponse option below)

| | Response | | Next State | |
|---|---|---|---|---|
| State | PRL | PRIL | PRL | PRIL |
| I | IACK | IACK | I | I |
| S | SACK | IACK | S/I | I |
| F | DATA_F | DATA_E | S/I | I |
| E | DATA_F | DATA_E | S/I | I |
| M | DATA_F | DATA_M | S/I | I |

```
If PRL snoop hits cache line in M state
    Initiate PWL request
    Buffer snoop (hold off sending DATA_F until writeback completes)
Else
    If snoop hit cache line (in M, E, or F state)
        Mark address as being forwarded
    Change cache line to next state
    Send response to requester
```

Gathering Responses
  Invocation:
  PRL/PRIL request received a response from a peer node
  Algorithm:

```
If response is a SACK (PRL only)
    Record existence of shared copy in system
Else if response is a DATA
    Record receipt of forwarded data from responding node
    Send cache line and new state to cache (note: line is not yet
        globally observable!)
```

```
Else if response is CNFL
    Add repsonding node to conflict list
Else if response is CNFLI
    Add responding node to conflict list
    Mark responding node as PRIL conflictor
-- End If
If all peer nodes have responded
    Mark request as being in "data phase"
    If a data response was received
        Send CNCL, forwarding node, and conflict list to home node
    Else
        Send READ and conflict list to home node
```

Cancel at Home Node
   Invocation:
   Home node received a CNCL (contains forwarding node
      and conflict list)
   Algorithm:

```
Cancel outstanding read (if any)
Mark requesting node as "current owner" for this address
Send DACK to forwarding node
If no conflicts
    Send ACK to requesting node
    -- conflictless cached epoch is complete
Else
    Incorporate conflict list as "outstanding requests" for this address
    -- wait for READs to XFR data to
```

Read Request at Home Node
   Invocation:
   Home node received a READ (contains conflict list)
   Algorithm:

```
If no current owner
    If data not available
        Wait for read to complete
    Send DATA_E to requesting node
    If conlict list is empty
        Send ACK to requesting node
        -- conflictless uncached epoch is complete
    Else
        Incorporate conflict list as "outstanding nodes" for this address
Else
    Add outstanding conflicts to "outstanding nodes" for this address
    Remove requesting node from "outstanding nodes"
    If no (remaining) outstanding nodes
        Send XFR (target: requesting node) to "current owner"
        Send ACK to requesting node
        -- epoch is complete
    Else
        If one or more outstanding nodes (including requester) is a PRIL
            Send XFRI (target: requesting node) to "current owner"
        Else
            Send XFR (target: requesting node) to "current owner"
        Mark requesting node as "current owner"
```

Transfer Reception
   Invocation:
   Requester received a XFR or XFRI (contains target node)
   Algorithm:

```
Wait for data if not yet received
If received XFRI
    Send PRIL snoop to cache
```

```
Else
    Send PRL snoop to cache
Add conflict list (sans receiving node) to DATA packet
Send DATA packet to target node
```

Transferred Data Reception
   Invocation:
   Requester received DATA (contains conflict list) as a result
      of a XFR
   Algorithm:

```
Send data to processor
Incorporate conflict list into current conflict list
If buffering requests matching entry in conflict list
    Respond with CNFL to each matching request
```

Forwarding DACK
   Invocation:
   Forwarding node received a DACK
   Algorithm:
   Unmark address as being forwarded
   Service buffered requests per algorithm for receiving peer
      requests Request ACK
   Invocation:
   Requester received an ACK from home node
   Algorithm:

```
If active request is a PWL
    Switch cache line to desired next state (E or I)
    If buffered snoop (PRL hit line in M state)
        Send DATA_F to requester
        Change cache line to next state (S) or to I state
Else (request is a PRL or PRIL)
    Release buffered requests (i.e., treat them as though they
        just arrived at the node)
Wait for data if not yet received
Send ACK to processor
<<<=== END OF BASE PROTOCOL ===>>>
```

PIL Request

In the protocol algorithms above the only way for a node to move a cache line from the F state to the E state is to invalidate the line (change line to I state) and then request a PRIL. This involves a DATA transfer.

To support direct F->E transition, a PIL request can be used. This request, sent to all peer nodes and the home node, and causes other caches to invalidate their shared copies of the line. To prevent in-flight PRILs and/or PRLs from interfering with the transition, PILs can be given higher priority.

Changes to Base Protocol:

Request Generation
  Invocation:
  Cache generated new request for an (inactive) address
  Algorithm:

```
Mark address as being active
If request is PRL or PRIL
    Send request to all other peer nodes and to home node
>>  If request is PIL
>>      Send request to all other peer nodes
If request is PWL
    Send request to home node
```

Request Reception by Peer Node
  Invocation:
  Request (PRL or PRIL) received at a peer node
  Only change to algorithm is to buffer request if there is an active PIL request, as is done with an active PWL.

PIL Request Reception by Peer Node
  Invocation:
  PIL request received at a peer node
  Algorithm:
  Send PIL snoop to cache Snoop Responses
  Same algorithm used with new Response/Next-State table (no entries for F, E, and M with PILs because requester in F and F, E, and M are mutually exclusive)

| State | Response |  |  | Next State |  |  |
|---|---|---|---|---|---|---|
|  | PRL | PRIL | PIL | PRL | PRIL | PIL |
| I | IACK | IACK | IACK | I | I | I |
| S | SACK | IACK | IACK | S/I | I | I |
| F | DATA_F | DATA_E |  | S/I | I |  |
| E | DATA_F | DATA_E |  | S/I | I |  |
| M | DATA_F | DATA_M |  | S/I | I |  |

Gathering Responses
  Invocation:
  PIL request received a response from a peer node
  Algorithm:

```
If all peer nodes have responded
    Tell cache to move line to E state
    Release any buffered requests
    -- PIL request is complete
```

M->S PWL and Immediate Response

A performance issue with PRLs hitting a line in M state is the need to writeback (issue a PWL) before forwarding the data. With some subtle changes, the data can be forwarded and written back simultaneously. The home node does not send the DACK until it has received both the PWL request and the CNCL from the requester/winner.

Changes to Base Protocol:

Request Reception by Home Node
  Invocation:
  Request received at home node
  Algorithm:

```
If request is PWL
    Initiate write to memory
    (Handle forwarding, canceling outstanding reads, etc.)
>>  If PWL was for PRL-hit-M
>>      If CNCL received
>>          Send DACK to forwarding node indicated in CNCL
>>      Else
>>          Mark address as being written back
>>  Else
>>      Send ACK back to requester
If request is PRL or PRIL
    Initiate read from memory
    (Buffer data if read finishes before a READ is received, etc.)
```

Snoop Responses
  Invocation:
  Request submitted (as a snoop) to cache for proper response generation
  Algorithm:

```
Do response/next-state look up as in base protocol
If snoop hit cache line (in M, E, or F state)
    Mark address as being forwarded
    Change cache line to next state
    If PRL snoop hits cache line in M state
        Initiate PWL marked as PRL-hit-M writeback
        Send DATA_F to requester, marked as PRL-hit-M
    Else
        Send response to requester
```

Gathering Responses
  Algorithm:

Differences are in recording PRL-hit-M data and notifying home node of the special forwarding when sending the CNCL:

```
Else if response is a DATA
    Record receipt of forwarded data from responding node
    If PRL request and hit M (indicated via DATA)
        Mark forwarding node as PRL-hit-M
    Send cache line and new state to cache (note: line is not yet
        globally observable!)
If all peer nodes have responded
    If a data response was received
        Send CNCL, forwarding node (marked as PRL-hit-M if it was),
            and conflict list to home node
```

Cancel at Home Node
  Invocation:
  Home node received a CNCL (contains forwarding node and conflict list)
  Algorithm:

```
Only difference is in determining whether to send a DACK:
    If forwarding node did PRL-hit-M writeback
        If PWL has been received
            Send DACK to forwarding node
```

-continued

```
    Else
        Mark address as needing writeback
    Else
        Send DACK to forwarding node
```

Forwarding DACK

No differences. The issued PWL is treated as a one-shot packet (or a request finished by the DACK.)

FM State

Another alternative for PRLs hitting a line in M state is to introduce the FM state to MESIF. This state indicates shared copies of a modified line. As with the M state, the data must be written back (PWL) if evicted from the cache. As with the F state, the data cannot be changed and the node responds with hits for read requests on the line.

When a node with the line in M state receives a PRL, it responds with DATA_FM instead of issuing a PWL and responding with DATA_F.

Transitioning from FM to M is not allowed except via a PIL. Changing from FM to E directly is not allowed.

Changes to Base Protocol:

Snoop Response

Invocation:

Request submitted (as a snoop) to cache for proper response generation

Algorithm:

Look up response and next state in table below based upon current cache state and incoming request type (next state of S/I means the cache can move the line to either state; note: still send DATA_F(M) for PRLs even if invalidating local copy—see PRL DATA_E/M Reponse option below)

|  | Response | | | Next State | | |
|---|---|---|---|---|---|---|
| State | PRL | PRIL | PIL | PRL | PRIL | PIL |
| I | IACK | IACK | IACK | I | I | I |
| S | SACK | IACK | IACK | S/I | I | I |
| F | DATA_F | DATA_E |  | S/I | I |  |
| E | DATA_F | DATA_E |  | S/I | I |  |
| M | DATA_FM | DATA_M |  | S/I | I |  |
| FM | DATA_FM | DATA_M |  | S/I | I |  |

```
    If snoop hit cache line (in M, E, or F state)
        Mark address as being forwarded
        Change cache line to next state
        Send response to requester
```

Conflictless Data

Sending a conflict list with transferred data is problematic for hardware. It is possible to avoid this conflict list if requests in the middle of transfer chains know they are in the middle and are allowed to respond to buffered requests (with IACK/SACK) after receiving transferred data. This allows all other conflicting nodes to make further progress, thus getting remaining READs to the home node.

With this option, requests (PRL and PRIL, i.e., read requests) go through four phases:
1) Send phase—sending requests
2) Gather phase—gathering responses (followed by sending READ or CNCL)
3) Data phase—waiting for data
4) Hold phase—in middle of conflict chain, hold data until XFR, send IACK/SACK to buffered and incoming requests In this embodiment, a request will know it is in the middle of the chain if there is no piggybacked ACK on the transferred DATA. Only this hold phase is different from the base protocol. In fact, the base protocol's data phase either stays the same (for conflictless requests or requests at the end of the epoch/conflict chain) or is divided into two phases, the first still being the data phase and the second now being the hold phase ending when the XFR is received.

Changes to Base Protocol:

Request Reception by Peer Node

Only change to algorithm is to check if there is an active request in its hold phase:

```
If address is being forwarded
    [same as before]
Else if address is not active
    [same as before]
Else if address is active
    If active request is a PWL
        [same as before]
    If incoming request is in active request's conflict list
        [same as before]
    Else if active request is in "hold phase"
        If incoming request is a PRL
            Respond with SACK (or IACK if previous PRIL got an IACK)
        Else -- incoming request is a PRIL
            Mark active request as needing to invalidate
            Respond with IACK
    Else if active request is in "data phase"
        [same as before]
    Else
        [same as before]
```

Gathering Response

Only change to this algorithm is that the request is complete if it sends a CNCL and its conflict list is empty. In other words, the system did a cache-to-cache transfer and there were no conflicts; the only thing left to do is notify home node, which does not need to be ACK'd.

Note: a CNCL'ing request (with conflicts) stays in data phase waiting for a XFR, i.e., it does not enter the hold phase.

Cancel at Home Node

Invocation:

Home node received a CNCL (contains forwarding node and conflict list)

Algorithm:

```
Cancel outstanding read (if any)
Mark requesting node as "current owner" for this address
Send DACK to forwarding node
If no conflicts
    -- conflictless cached epoch is complete
Else
    Incorporate conflict list as "outstanding requests" for this address
    -- wait for READs to XFR data to
```

Read Request at Home Node

Invocation:
  Home node received a READ (contains conflict list)
Algorithm:

```
If no current owner
    If data not available
        Initiate read if necessary
        Wait for read to complete
    Send DATA_E to requesting node
    If conflict list is empty
        -- conflictless uncached epoch is complete
    Else
        Incorporate conflict list as "outstanding nodes" for this address
        -- wait for READs to XFR data to
Else
    Add outstanding conflicts to "outstanding nodes" for this address
    Remove requesting node from "outstanding nodes"
    If no (remaining) outstanding nodes
        Send XFR+ACK (target: requesting node) to "current owner"
        -- epoch is complete
    Else
        If one or more outstanding nodes (including requester) is a PRIL
            Send XFRI (target: requesting node) to "current owner"
        Else
            Send XFR (target: requesting node) to "current owner"
        Mark requesting node as "current owner"
```

Transfer Reception

A change here (in addition to handling a XFR+ACK) is determining if during the hold phase an IACK response was spoofed for a PRIL. If so, the line is invalidated using the snoop.

Invocation:
  Requester received a XFR, XFR+ACK, or XFRI (contains target node)
Algorithm:

```
Wait for data if not yet received
    If received XFRI or request is marked as needing to invalidate
        Send PRIL snoop to cache
    Else
        Send PRL snoop to cache
    -- End If
If received XFR+ACK
    Send DATA+ACK packet to target node
Else
    Send DATA packet to target node
```

Transferred Data Reception

Invocation:
  Requester received DATA or DATA+ACK as a result of a XFR (requester is in data phase, so it knows this is via a XFR)
Algorithm:

```
Send data to processor
If received DATA packet
    Move request to hold phase
    Foreach buffered request
        If buffered request is a PRL
            Respond with SACK (or IACK if previous PRIL got an IACK)
        Else -- buffered request is a PRIL
            Mark local request as needing to invalidate
            Respond with IACK
```

```
Else -- received DATA+ACK
    -- request is complete and epoch is complete
```

PRL DATA_E/M Response

When a PRL snoop hits a cache line, it has to respond with DATA_F to maintain correctness, regardless of whether the cache transitions the line to S or I. It is possible to support sending a DATA_E when transitioning to I, but it requires an additional communication with the cache to let it know that the E state it received needs to be demoted to F. Basically, the algorithm is that if the node has already received a DATA_E then receives an SACK, it must change the cache state from E to F.

What is claimed is:

1. A method comprising:
  resolving conflicting requests from multiple peer nodes for a block of data by a peer node having a valid copy of requested data that is requested by the conflicting requests;
  resolving conflicting requests for the block of data by a home node corresponding to the requested data if no unique, cached copy is stored by one of the peer nodes;
  wherein resolving conflicting requests by a peer node comprises:
  receiving, from a peer node having a valid copy of the requested data, a list of peer nodes that have transmitted conflicting requests for the requested data; and
  transmitting a copy of the requested data to a target peer node from the list.

2. The method of claim 1 wherein transmitting a copy of the requested data to the target peer node further comprises transmitting the list, less the transmitting peer node, to the target peer node.

3. The method of claim 1 further comprising receiving an acknowledgement message from a home node corresponding to the requested data.

4. The method of claim 1 further comprising changing a state associated with a copy of the requested data stored by the peer node transmitting the requested to the target node.

5. The method of claim 1 wherein resolving conflicting requests by the home node comprises:
  receiving, from a peer node, a list of peer nodes that have transmitted conflicting requests for the requested data; and
  transmitting a copy of the requested data from the home node to a target node from the list.

6. The method of claim 5 wherein transmitting a copy of the requested data to the target node further comprises transmitting the list, less the transmitting node, to the target node.

7. The method of claim 1 wherein the block of data comprises a cache line.

8. A system comprising:
  a plurality of peer nodes having cache memories to generate requests for data, a peer node having a valid, cached copy of requested data to resolve conflicting requests and to provide a copy of the requested data to one of the multiple requesting peer nodes;
  a home node corresponding to the requested data coupled with the peer nodes, the home node to resolve the conflicting requests if no peer node stores a valid, cached copy of the requested data;

wherein one or more of the requesting peer nodes transmits a list of peer nodes that generated a conflicting request to the peer node to resolve the conflict; and wherein the peer node to resolve the conflicting requests transmits a copy of the requested data to a target node from the list.

9. The system of claim 8 wherein the requested data comprises a cache line.

10. The system of claim 8 wherein the peer node to resolve the conflicting requests further to transmit a copy of the list, less the transmitting node, to the target node.

11. The system of claim 8 wherein one or more of the requesting peer nodes transmits a list of peer nodes that generated a conflicting request to the home node.

12. The system of claim 11 wherein the home node transmits a copy of the requested data to a target node from the list.

13. The system of claim 12 wherein the peer node to resolve the conflicting requests further to transmit a copy of the list, less the transmitting and target nodes, to the target node.

14. The system of claim 8 wherein a peer node comprises:
a processor;
a cache memory coupled with the processor; and
an external memory coupled with the processor.

15. The system of claim 8 further comprising an agent to represent multiple nodes coupled with the peer nodes and the home node.

16. An apparatus comprising:
means for resolving conflicting requests from multiple peer nodes for a block of data by a peer node having a valid copy of requested data that is requested by the conflicting requests;
means for resolving conflicting requests for the block of data by a home node corresponding to the requested data if no unique, cached copy is stored by one of the peer nodes;
wherein the means for resolving conflicting requests by a peer node comprises:
means for receiving, from a peer node having a valid copy of the requested data, a list of peer nodes that have transmitted conflicting requests for the requested data; and
means for transmitting a copy of the requested data to a target peer node from the list.

17. The apparatus of claim 16 wherein the means for resolving conflicting requests by the home node comprises:
means for receiving, from a peer node, a list of peer nodes that have transmitted conflicting requests for the requested data; and
means for transmitting a copy of the requested data from the home node to a target node from the list.

18. The apparatus of claim 16 wherein the block of data comprises a cache line.

* * * * *

UNITED STATES PATENT AND TRADEMARK OFFICE
CERTIFICATE OF CORRECTION

| | | |
|---|---|---|
| PATENT NO. | : 7,434,006 B2 | Page 1 of 1 |
| APPLICATION NO. | : 11/165688 | |
| DATED | : October 7, 2008 | |
| INVENTOR(S) | : Beers et al. | |

It is certified that error appears in the above-identified patent and that said Letters Patent is hereby corrected as shown below:

In column 22, line 44, in Claim 4, after "requested" insert -- data --.

Signed and Sealed this

Seventeenth Day of February, 2009

JOHN DOLL
*Acting Director of the United States Patent and Trademark Office*